United States Patent
Feldbau et al.

(10) Patent No.: US 6,182,219 B1
(45) Date of Patent: Jan. 30, 2001

(54) APPARATUS AND METHOD FOR AUTHENTICATING THE DISPATCH AND CONTENTS OF DOCUMENTS

(76) Inventors: Ofra Feldbau; Michael Feldbau, both of 12, Avtalyon Street, Ramat Gan 52424 (IL)

(*) Notice: Under 35 U.S.C. 154(b), the term of this patent shall be extended for 0 days.

(21) Appl. No.: 08/981,461
(22) PCT Filed: Aug. 27, 1996
(86) PCT No.: PCT/IB96/00859
  § 371 Date: Dec. 23, 1997
  § 102(e) Date: Dec. 23, 1997
(87) PCT Pub. No.: WO97/08869
  PCT Pub. Date: Mar. 6, 1997

(30) Foreign Application Priority Data

Aug. 28, 1995 (EP) ................................. 95113489
Feb. 22, 1996 (IL) ........................................ 117234

(51) Int. Cl.[7] ............................................. H04L 9/32
(52) U.S. Cl. .................. 713/176; 713/178; 713/170; 713/155; 705/75; 380/258; 380/259; 380/260
(58) Field of Search ................................. 380/1, 23, 25, 380/55, 59, 258, 259, 260, 262, 283, 285, 28, 30; 713/200, 201, 176, 178, 170, 155; 703/67, 76; 705/76

(56) References Cited

U.S. PATENT DOCUMENTS 4,326,098 * 4/1982 Bouricius et al. ............... 178/22.08
4,458,109 * 7/1984 Mueller-Schloer ............... 178/22.11

(List continued on next page.)

FOREIGN PATENT DOCUMENTS 0 516 898 A1  12/1992 (EP) .

OTHER PUBLICATIONS

Schneier, Applied Cryptography, First Edition, p. 426, 1993.* ccVault.com, "What is registered©ccvault.com?" Retrieved from the Internet <URL:http://www.ccvault.com/register.html>, 1999.*

(List continued on next page.)

*Primary Examiner*—Gilberto Barron, Jr.
*Assistant Examiner*—Paul E. Callahan
(74) *Attorney, Agent, or Firm*—Leydig, Voit & Mayer, Ltd.

(57) ABSTRACT

Apparatus and method for authenticating that a sender has sent certain information via a dispatcher to a recipient is disclosed. The method includes the steps of: (a) providing a set A comprising a plurality of information elements a1, ... an, said information element a1 comprising the contents of said dispatched information, and said one or more information elements a2, ... an comprising dispatch-related information and comprise at least the following elements: a2—a time indication associated with said dispatch; and a3—information describing the destination of said dispatch, and wherein at least one of said information elements is provided in a manner that is resistant or indicative of tamper attempts by said sender, (b) associating said dispatch-related information with said element at by generating authentication-information, in particular comprising a representation of at least said elements a1, a2 and a3, said representation comprising a set of one or more elements, each comprising a representation of one or more elements of said set A; (c) securing at least part of said authentication-information against undetected tamper attempts of at least said sender. The dispatch relates either to transmission or to manual delivery. The apparatus implements the operations of the method.

89 Claims, 7 Drawing Sheets

U.S. PATENT DOCUMENTS

| | | | | |
|---|---|---|---|---|
| 5,001,752 | * | 3/1991 | Fischer | 380/23 |
| 5,022,080 | | 6/1991 | Durst et al. | 380/23 |
| 5,136,643 | * | 8/1992 | Fischer | 380/23 |
| 5,136,646 | | 8/1992 | Haber et al. | 380/49 |
| 5,136,647 | | 8/1992 | Haber et al. | 380/49 |
| 5,163,091 | * | 11/1992 | Graziano et al. | 380/25 |
| 5,189,700 | * | 2/1993 | Blandford | 380/23 |
| 5,339,361 | | 8/1994 | Schwalm et al. | 380/23 |
| 5,373,561 | | 12/1994 | Haber et al. | 380/49 |
| 5,422,953 | * | 6/1995 | Fischer | 380/23 |
| 5,454,038 | * | 9/1995 | Cordery et al. | 380/23 |
| 5,475,753 | * | 12/1995 | Barbara et al. | 380/4 |
| 5,671,282 | * | 9/1997 | Wolff et al. | 380/25 |
| 5,748,738 | * | 5/1998 | Bisbee et al. | 380/25 |
| 5,771,292 | * | 6/1998 | Zunquan | 380/25 |
| 5,781,630 | * | 7/1998 | Huber et al. | 380/23 |
| 5,910,986 | * | 6/1999 | Dove | 380/23 |
| 5,923,763 | * | 7/1999 | Walker et al. | 380/51 |

OTHER PUBLICATIONS

Lipton, "Firm Offers Certified Email," CNET News.com. Retrieved from the Internet <URL:http://www.news.com<, Aug. 4, 1998.*

Non–repudiation: Constituting evidence and proof in digital cooperation; Computer standards and Interfaces, Netherlands, Jan. 31, 1995; S. Herda; vol. 17, No. 1, pp. 69–79.

EPO Search Report for PCT/IB96/00859 which corresponds to this application.

A Universal Algorithm for Sequential Data Compression; Ziv. J., Lempel A., IEEE Transactions On Information Theory; vol. 23, No. 3, pp. 337–343.

A Method for Obtaining Digital Signatures and Public–Key Cryptosystems; Rivest, R.L., A. Shamir, and L. Adelman, Communications of the ACM, ACM Inc.; Feb. 1978, vol. 21, No. 2, pp. 120–126.

The MD4 Message Digest Algorithm; R.L. Rivest; Crypto '90 Abstracts; Aug. 1990, pp. 301–311, Springer–Verlag.

One–Way Hash Functions; B. Schneier; Dr. Dobb's Journal M&T Publishing Inc.; Sep. 1991, vol. 16, No. 9, pp. 148–151.

The MD5 Message Digest Algorithm; R.L. Rivest; Apr. 1992.

File Verification Using CRC; Nelson, Mark R.; Dr. Dobb'Journal, M & T Publishing Inc., May 1992, vol. 17, No. 5 pp. 64–67.

The Digital Signature Standard proposed by the National Institute of Standards and Technology; Communications of the ACM, ACM Inc., Jul. 1992, vol. 35, No. 7, pp. 36–40.

Cyclic Redundancy Checksums (Tutorial); Louis B. Gregory; C. Users Journal, R & D Publications Inc., Oct. 1992, v10 n10 p55(6).

Applied Cryptography (2nd Edition); Schneier Bruce, John Wiley & Sons, 1996, Chapter 2 pp. 34–44, Chapter 3 pp. 52–56, Chapter 4 pp. 75–79, Chapter 12 pp. 265–301, Chapter 13 pp. 319–325, Chapter 18 pp. 429–431, 436–441, 455–459, Chapter 19 pp. 461–462, 466–474, Chapter 20 pp. 483–502, Chapter 21 pp. 503–512 and Chapter 24 pp. 584–587.

Security for Computer Networks; An Introduction to Data Security in Teleprocessing and Delectronic Funds Transfer (Second Edition); D.W. Davies and W.L. Price; John Wiley & Sons, pp. 130–131.

* cited by examiner

E-MAIL AUTHENTICATION SERVICE
USING DIGITAL SIGNATURES

APPARATUS AND METHOD FOR AUTHENTICATING THE DISPATCH AND CONTENTS OF DOCUMENTS

FIELD OF THE INVENTION

The present invention relates to a method and apparatus for authenticating the dispatch and the contents of dispatched information in general.

BACKGROUND OF THE INVENTION

Post, courier, forwarding and other mail services, which enable people to exchange documents and data, have been widely used both in the past and at the present time. With the evolution of modern technology, the use of electronic dispatch devices and systems, such as modems, facsimile machines, electronic mail (E-Mail) and EDI systems, computers, communication networks, and so forth, to exchange data and documents is rapidly evolving.

A substantial quantity of the information exchanged, such as contracts, purchase orders, invoices, monetary orders, notices, and even warning and notification messages, are of utmost importance. Sometimes, when a dispute arises between the sending and receiving party of the exchanged information, the receiving party may raise the claim that he never received the information, that the received information was different from what the sender claims to have sent, or the receiving party may even attempt to forge the received information.

The need, therefore, arises for the sender to prove that specific information has been sent at a specific time to that specific receiving party.

Various solutions to various related problems have been proposed in the literature. For example, the transmission operation itself may be authenticated, as shown in U.S. Pat. No. 5,339,361 (Schwalm et al.), which describes a communication system providing a verification system to identify both the sender and recipient of electronic information as well as an automatic time stamp for delivery of electronic information. This patent, however, does not verify the dispatched information.

Document authentication methods, for example by notarization, have long been in use. A method for notarization of electronic data is provided by EP-A-516 898 (PITNEY BOWES INC.) or its patent family member U.S. Pat. No. 5,022,080 (Durst et al.) which authenticates that source data has not been altered subsequent to a specific date and time. The method disclosed includes mathematically generating a second unit of data from the first unit of data, as by CRC generation, parity check or checksum. The second unit of data is then encrypted together with a time/date indication, and optionally with other information to form an authentication string. Validation that the first unit of data has not been changed is provided by comparing the original data's authentication string with the authentication string generated from the data and time in question. A method is even suggested for having the recipient verify the authenticity of the sender, the time of transmission and the data.

Other patents which discuss document authentication are U.S. Pat. Nos. 5,136,646 and 5,136,647 both to Haber et al. According to these patents, a unique digital representation of the document (which is obtained by means of a one-way hash function) is transmitted to an outside agency, where the current time is added to form a receipt. According to U.S. Pat. No. 5,136,647, the receipt is certified using a cryptographic digital signature procedure, and is optionally linked to other contemporary such receipts thereby fixing the document's position in the continuum of time. According to U.S. Pat. No. 5,136,646, the receipt is certified by concatenating and hashing the receipt with the current record catenate certificate which itself is a number obtained by sequential hashing of each prior receipt with the extent catenate certificate.

Various cryptographic schemes are known in the prior art for encrypting and for authenticating digital data and/or its author. For example Symmetric algorithms such as DES [1.01] and IDEA [1.02], one-way hash functions [1.03] such as MD5 [1.04], Public-Key (asymmetric) algorithms [1.05] such as RSA [1.06], and verifiable digital signatures generation algorithms [1.12] such as DSA [1.07] or RSA, as well as combinations thereof such as PGP [1.08] and MACs [1.13], are currently widely used for security and for authentication purposes [1.09]. An excellent publication relating to encryption, authentication, public-key cryptography and to cryptography and data security in general, as well as applications thereof and additional references to multiple sources can be found in [1]. Further prior art, in particular referring to integrity of stored data, can be found in D. W. Davies & W. L. Price "Security for computer networks", 1989, John Wiley & Sons, Chichester (UK).

Proof of delivery of non-electronic documents is provided, for example, by Registered Mail and courier services. It is commonly used to authenticate the delivery of materials at a certain time to a certain party, and serves as admissible proof of delivery in a court of law. However, no proof is provided as to the information contents of the specific dispatch.

E-mail and other electronic messages forwarding services are commonly used today. The sender sends a message to the dispatching service which, in turn, forwards the message to the destination and provides the sender with a delivery report which typically includes the date and time of the dispatch, the recipient's address, the transmission completion status, and sometimes even the transmitted data, the number of pages delivered, the recipient's identification information, and so on. The provided delivery report mainly serves for accounting purposes and for notifying the sender of the dispatch and/or its contents. Moreover, frequently no record of the specific dispatched data is maintained with the service after the delivery is completed or provided to the sender.

SUMMARY OF THE PRESENT INVENTION

The literature does not provide a comprehensive solution that directly addresses the problem in question: what information has been sent to whom and when. Accordingly, there is a need for a method and system to provide the sender with a convenient means for authenticating both the dispatch and the contents of documents, electronic information and other information during the normal flow of daily activities.

It is therefore an object of the present invention to improve the capacity of conventional systems and methods for dispatching documents and transmitting information to provide the sender with evidence he can use to prove both the dispatch and its contents.

The present invention discloses an apparatus according to claim 1 for authenticating that certain information has been sent by a sender via a dispatcher to a recipient, the apparatus comprising:

means for providing a set A comprising a plurality of information elements a1, . . . ,an, said information element a1 comprising the contents of said dispatched information, and said one or more information elements a2, . . . ,an containing dispatch-related information and comprise at least the following elements:

a2—a time indication associated with said dispatch; and a3—information describing the destination of said dispatch, and wherein at least one of said information elements is provided in a manner that is resistant or indicative of tamper attempts by said sender;

means for associating said dispatch-related information with said element a1 by generating authentication-information, in particular comprising a representation of at least said elements a1, a2 and a3, said representation comprising a set of one or more elements, each comprising a representation of one or more elements of said set A; and means for securing at least part of said authentication-information against undetected tamper attempts of at least said sender.

Thus, the present invention provides a sender with the capability to prove both the dispatch and the contents of the dispatched materials. The dispatched materials can be paper documents, electronic information or other information which can be dispatched electronically by transmission or non-electronically, such as by courier or registered mail service, to an address of a recipient.

According to the present invention, dispatch related information is associated with the contents of the dispatch, in a relatively secure, or reliable manner. This associated information can be provided for example to the sender, and may serve as evidence of both the dispatch and its contents, for example, in a court of law, and therefore it is collectively referred to herein as the "authentication-information" or "evidence".

Additionally, the present invention discloses a method according to claim 27, wherein in essence, a set A comprising a plurality of information elements a1, . . . , an is provided, said information element a1 comprising the contents of the dispatched information, and said one or more information elements a2, . . . , an containing dispatch-related information and comprise at least the following elements:

a2—a time indication associated with said dispatch; and a3—information describing the destination of said dispatch, and wherein at least one of said information elements is provided in a manner that is resistant or indicative of tamper attempts by said sender.

Said dispatch-related information is associated with said element a1 by generating authentication-information, in particular comprising a representation of at least said elements a1, a2 and a3, said representation comprising a set of one or more elements, each comprising a representation of one or more elements of said set A, and at least part of said authentication-information is secured against undetected tamper attempts of at least said sender.

It is appreciated that in accordance with the present invention, the representation can comprise any number of any combination in any form of: the elements themselves, identical or equivalent elements such as copies thereof or information describing or identifying these elements, information expressive as a mathematical function of one or more of these elements and so forth. Each combination may be maintained jointly or separately as desired. The representation has a recursive characteristic, i.e., it can comprise a representation of one or more of the above.

The present invention encompasses all types of information being dispatched, such as that found on paper documents or within electronic documents and other electronic data, and all types of dispatch methods, such as transmission via facsimile machines, modems, computer networks, electronic mail systems and so forth, or manually such as via registered mail or courier services.

The term "the contents of the dispatch" herein refers to any information element having information content the substance of which is equivalent to that of the information being dispatched. This includes for example the information source, either in paper document or electronic form, the actual dispatched information, any copies thereof, any descriptive information or portion of the information contents identifying the dispatched information, and so forth regardless of the representation or form.

The present invention also encompasses all types of methods and apparatuses which provide and/or associate the dispatch information with the contents in a relatively secure or reliable manner. The terms "relatively secure" and "reliable" herein mean "reasonably tamper-proof" or "tamper-detectable", i.e., that it is assured that the authentic information elements are provided and associated in a reliable manner, for example by a non-interested third party or by a device or by a combination of both, and furthermore, that the associated authentication-information is secured against fraudulent actions such as disassociation, modification, replacement etc., attempted by an interested party such as the sending or receiving party, at least to the extent that such actions are detectable.

The dispatch information can be any information describing at least the time and destination of the dispatch and preferably the dispatch completion status. Other information relating to the dispatch, such as the identity of the sender and/or the recipient, handshake information, the actual elapsed dispatch time, the number of pages dispatched and so forth, the identification of the authenticator, for example its name, logo, stamp, etc., can also be provided.

Finally, the authentication-information can be secured or stored in a secure location or device, in its entirety or in part, together or separately, as desired.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
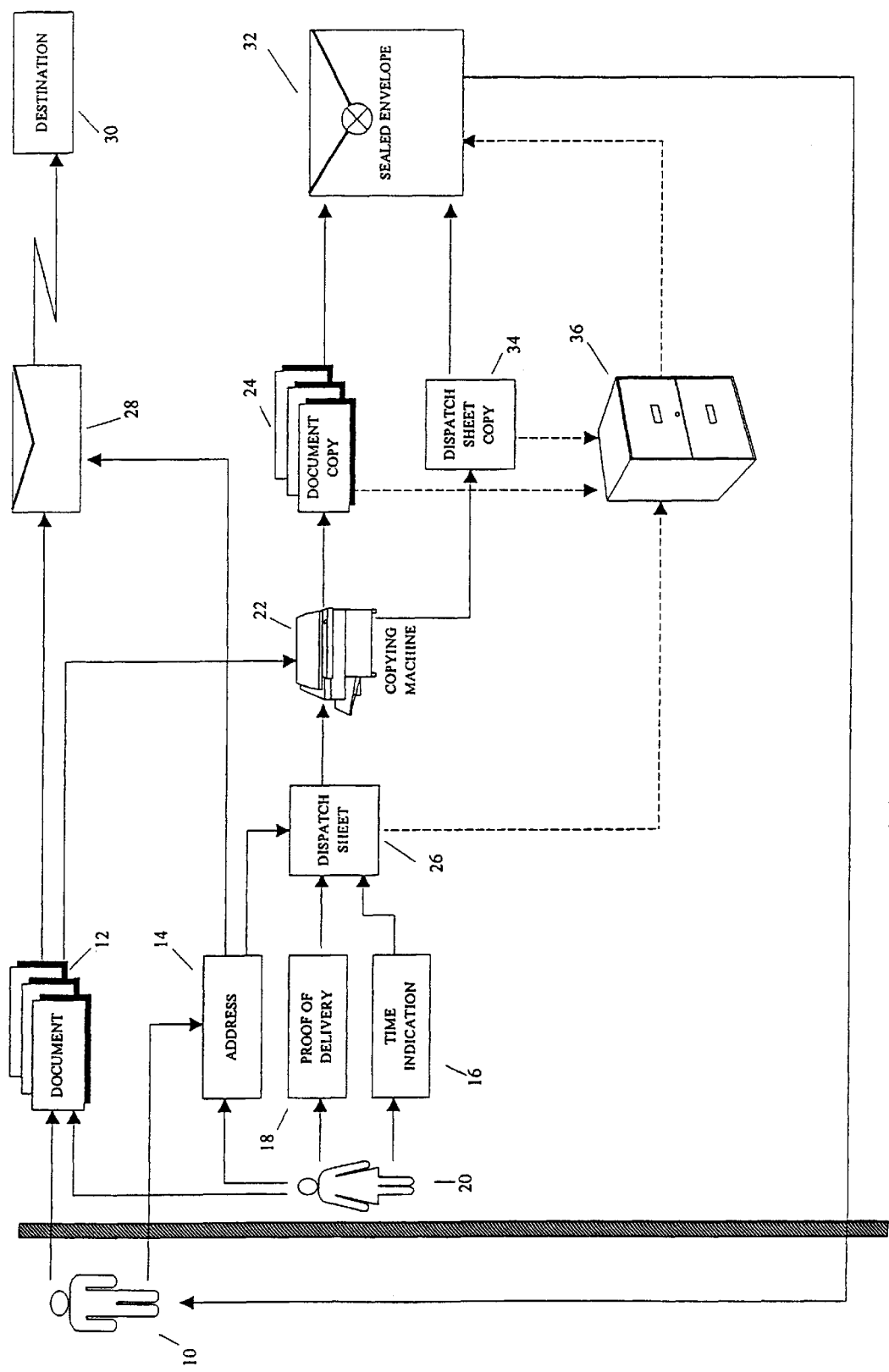
FIG. 1 is a schematic pictorial illustration of the authentication method of the present invention implemented in a manual manner.

Reference is now made to FIG. 1 which illustrates the method of the present invention as it can be implemented for paper documents being sent non-electronically. The method of FIG. 1 can be implemented for documents sent via any document dispatching service, such as a courier service or the registered mail service of the post office.

The sender 10 provides the documents 12 to be sent and a destination address 14 to a clerk 20 of the document dispatching service. The clerk 20 prepares a dispatch sheet 26, which typically has a unique dispatch identifier (not shown) and has room for dispatch information such as the date and time of dispatch or delivery 16, the destination address 14, an indication 18 of proof of delivery such as the recipient's identity and/or signature, and optionally, additional dispatch information such as the dispatcher's signature and the identity of the sender 10, etc.

The clerk 20 fills in the dispatch sheet 26 with the date/time 16 and the address 14, and then prepares a copy 24 of the documents 12 and a copy 34 of the dispatch sheet 26, typically by utilizing a copy machine 22 or an electronic scanner. The clerk 20 then places the original documents 12 into an envelope 28 carrying the address 14, and sends the envelope 28 to its destination 30. In one embodiment of the present invention the dispatching service utilizes a cash-register like device to fill in the dispatch sheet 26. This provides for reliable time stamping and automated dispatch record keeping. Furthermore, the electronic dispatch information produced by such device can be associated using a special mathematical method as discussed in greater detail hereinbelow.

The clerk 20 associates the copy 24 of the documents 12 with the copy 34 of the dispatch sheet 26 by any method, a few examples of which follow:

a) by inserting the documents copy 24 and the dispatch sheet copy 34 into an envelope 32;

b) by inserting the copy 24 of the documents into an envelope 32 and marking the dispatch identifier on the outside of the envelope 32;

c) by printing the dispatch identifier on the documents copy 24; or d) attaching the copies 24 and 34 and applying the stamp of the dispatch service in such a manner that part of the stamp is on the copy 24 of the documents and part of the stamp is on the copy 34 of the dispatch sheet 26.

Preferably, the clerk 20 secures the copies 24 and 34 in a manner that makes it difficult to modify or replace the information contained therein, for example by marking the pages of the copy 24 with the dispatching service's signature, stamp or seal, by spreading each page with invisible or other ink, by sealing the envelope 32 or by retaining them in the service's secure file 36 and so forth.

In one embodiment of the present invention, the associated copies 24 and 34 are provided to the sender at this stage (where the dispatch sheet 26 is retained with the service to ascertain delivery and to fill in the proof of delivery indication 18) or after the delivery is completed. In another embodiment, the dispatch service retains, in a secure location 36, one or both of the copies 24 and 34.

The clerk 20 can also identify the authenticating party, for example via his signature, or by having the dispatch sheet copy 34 printed on the stationary of the dispatching service, by stamping the documents and/or dispatch sheet copies with the service's stamp, logo or seal, etc.

When it is desired to authenticate the dispatch of the original documents (and possibly also their receipt at the destination 30), either the sender or the document dispatching service provides the associated authentication-information, for example the envelope 32, unopened, to the party which required the authentication. When the envelope 32 is opened, it has associated therewith copies of both the dispatched documents and the dispatch information. The envelope 32 therefore, provides a reliable proof that the original documents 12 were dispatched on the date and to the destination listed on or in envelope 32.

It will be appreciated that, since a non-interested third party who is neither the sender nor the receiver copied the original documents 12 being sent, it is unlikely that the copies stored in the envelope 32 are other than copies of the original documents 12.

Various modifications can be made to the embodiment provided hereinabove. For example, the document copy could be sent to the destination while the original could be authenticated. The authentication-information could be provided by the service, directly to the court of law. The document copy could be produced by a scanner or a camera and stored in an electronic or other storage device such as a disk or on microfilm, while a copy thereof is provided to the sender. The original dispatch sheet could be first filled out and then provided to the sender instead of using a copy. Moreover, the original documents could be scanned by the sender in the service's premises into a secure disk and one printed copy thereof could be sent by the service to the destination while another copy could be authenticated and provided to the sender. Alternatively, the documents could be provided to the service via transmission (e.g., by facsimile machine) rather than manually. In the case of a courier, the courier could produce the copy himself using a photocopier at the sender's premises, and so forth.

Figure 2:
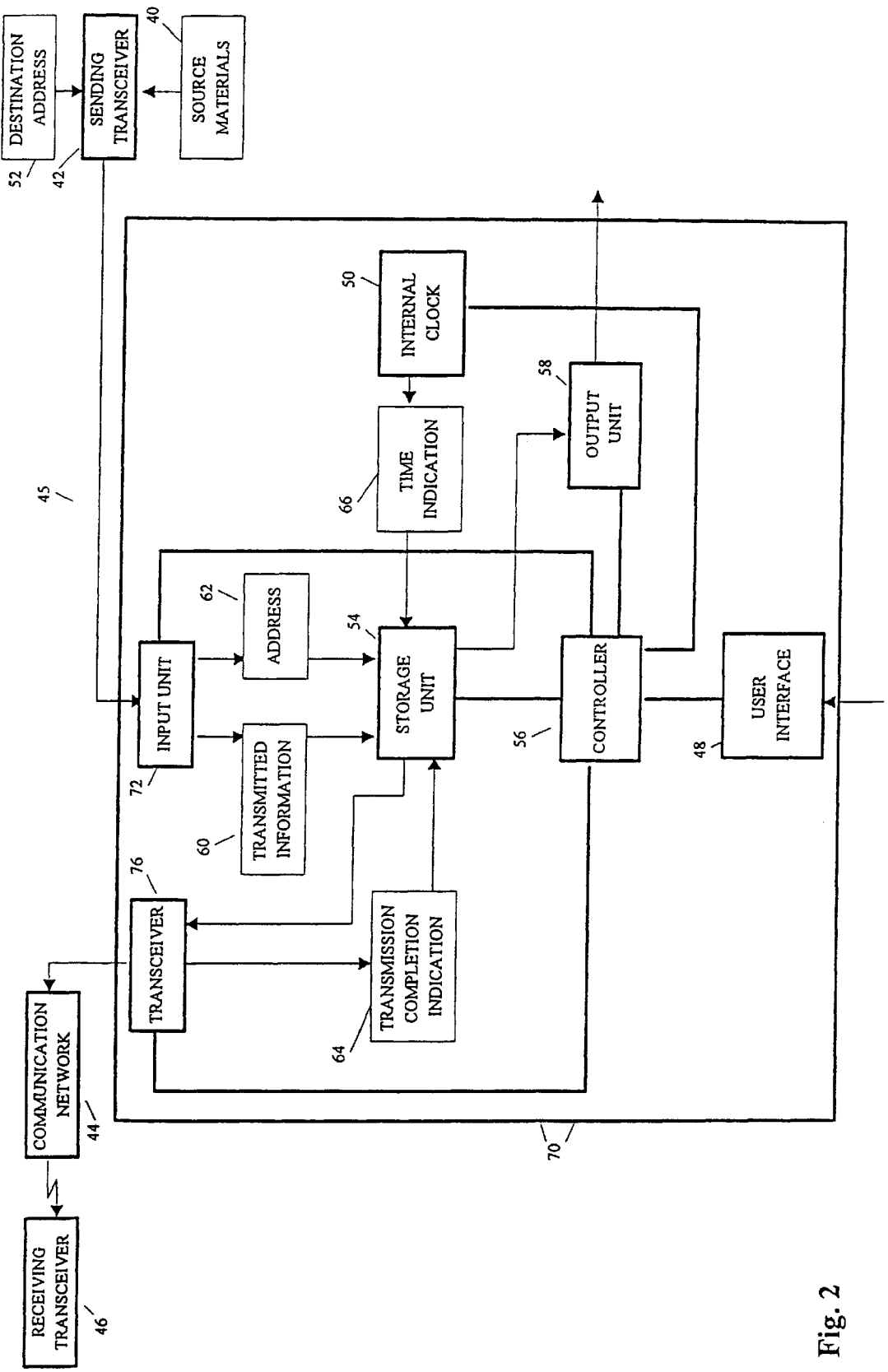
FIG. 2 is a schematic illustration of an authenticator, constructed and operative in accordance with a preferred embodiment of the present invention.

Reference is now made to FIG. 2 which illustrates an authenticator 70, constructed and operative in accordance with a preferred embodiment of the present invention, which can be part of a system for transmitting information, whether by facsimile machine, modem, computer, network or E-Mail stations, and any combinations thereof, or by other electronic means.

FIG. 2 illustrates a data communication system comprising a sending transceiver 42, a communication line 45, coupled to the sending transceiver 42, a communication network 44 and a receiving transceiver 46. Authenticator 70 of the present invention communicates at least with the sending transceiver 42, and can form part of the sending transceiver 42 or can be separated therefrom.

The sender provides original materials 40 for transmission, which can be paper documents or electronic information such as computer disk, memory and other electronic information including audio/video, text and graphics files or pictures. The sender also provides the destination address 52 which represents the address of the receiving transceiver 46 on communication network 44. The address 52 may for example be a dial number, a network user code and so forth. The sending transceiver 42 needs to transmit the information contents of the materials 40 to the receiving transceiver 46. To provide authentication, the transmission in FIG. 2 is performed through the authenticator 70 in a "store & forward" manner.

The authenticator 70 comprises input means 72 for receiving the transmitted information 60 and the destination address 62 from the communication line 45. The input means 72 may for example comprise a line interface, a Dual-Tone Multi Frequency (DTMF) decoder for receiving a destination address 62 such as a dial number, and a transceiver similar to that of the sending transceiver 42 which can receive the information 60.

The authenticator 70 also comprises an optional storage unit 54 such as a tape, disk or memory device and so forth for storing the information 60 and related dispatch information, an internal clock 50 for generating a time indication 66 of the transmission, a transceiver 76 for transmitting the information 60 to address 62 (the transceiver 76 can be used by the input unit 72 as well, for example by using a relay mechanism), a controller 56, a user interface 48, and an output unit 58 for providing the authentication-information, for example to the sender.

The information 60 is then transmitted over the communication network 44 to the receiving transceiver 46 by the transceiver 76 using the address 62.

The internal clock 50 provides an indication 66 of the current time, and is utilized to provide a time indication for the transmission. Internal clock 50 is securable (to ensure the veracity of the produced time indication 66), and preferably provides time indications according to a non-changing time standard, such as Greenwich-Mean-Time (G.M.T.) or UTC. Alternatively, the time indication 66 can be externally obtained, for example from a communication network server, as long as the source is secured from being set or modified by an interested party such as the sender. The security of the time indication can be provided in a number of ways, such as by factory pre-setting the clock 50 and disabling or password securing the Set Date/Time function of the internal clock 50. Alternatively, the clock 50 can maintain a "true offset" with the true preset date/time, that reflects the offset of the user set date/time from the genuine preset one.

The transmission completion indication 64 provides information regarding the success of the transmission. It is typically obtained from the communication protocol used by the transceiver 76. It may be for example in the form of an electronic signal provided by the transceiver 76 which is used to determine the validity of the rest of authentication-information, or in a form similar to that provided in transmission reports such as "TRANSMISSION OK" or "ERROR". In one embodiment of the present invention, the fact that the rest of authentication-information elements are provided, indicates that an affirmative completion indication has been provided.

The storage unit 54 is used for storing the information 60 and/or the dispatch information, including the address 62, the time indication 66, and optionally the transmission completion indication 64. Typically, the storage unit 54 is relatively secure, such that the authentication-information contained therein is assumed unchangeable. For example it may be a Write-Once-Read-Many (WORM) device such as an optical disk or a Programmable Read-Only Memory (PROM) device, it may be enclosed within a securable device, or it may be provided with read-only access privilege. Alternatively, the authentication-information is stored in a secure manner, for example using a compression, private or public key encryption or scrambling technique, a password, or a combination thereof, such as those employed by the widely used RSA encryption method, and by the PKZIP(tm) program from PKWARE Inc., Glendale Wis., U.S.A., and where the "securing" procedure, key or password are unknown to any interested party.

The controller 56 associates the information 60 and the dispatch information, by storing them in storage unit 54 and by associating link information with the stored authentication-information, for example in the form of a unique dispatch identifier such as a sequential dispatch number.

To provide the authentication-information for the transmission, the dispatch identifier is provided to the controller 56 through the user interface 48. The controller 56, in turn, retrieves the various stored authentication-information elements from storage unit 54. If the stored information is also secured (i.e., by compression, password, etc.), the controller 56 "unsecures" them, and then provides them to the output unit 58.

The output unit 58 provides the authentication-information to an output device (not shown). The authenticator 70 may include an output device or may communicate with some external unit. The output device can be, for example, a printing unit, a display unit, a storage unit such as a computer disk, the printing apparatus of the sending transceiver 42 and so forth.

The information 60 and the dispatch information, can be associated with each other in any suitable manner. For example, if the materials 40 provided for transmission are paper documents, one embodiment of the authenticator 70 authenticates the original documents by printing the dispatch information on them. In another embodiment, they can be stored in storage unit 54 together (e.g., sequentially or combined into a single file), or separately using a link information element (e.g., using a dispatch identifier). If the output is a printout, output unit 58 typically formats the printout to indicate the dispatch information on at least one, and preferably on all, of the pages containing the printout. Alternatively, a link information element, such as a dispatch identifier, can be printed on each printed page of the information 60, and separately on a dispatch page containing the dispatch information. Another method includes printing both the information 60 and the dispatch information together on contiguous paper, optionally between starting and ending messages, and so forth. An alternative special mathematical association method is discussed hereinbelow.

Typically, the authenticator 70 is relatively secure, such that the various devices and the authentication-information elements enclosed therein can be assumed to be unchangeable. For example, the authenticator 70 can be enclosed within a password protected sealed electronic box which, if opened without authorization, may disable the normal operation of the authenticator 70, or may clearly indicate that it has been tampered with.

Figure 3:
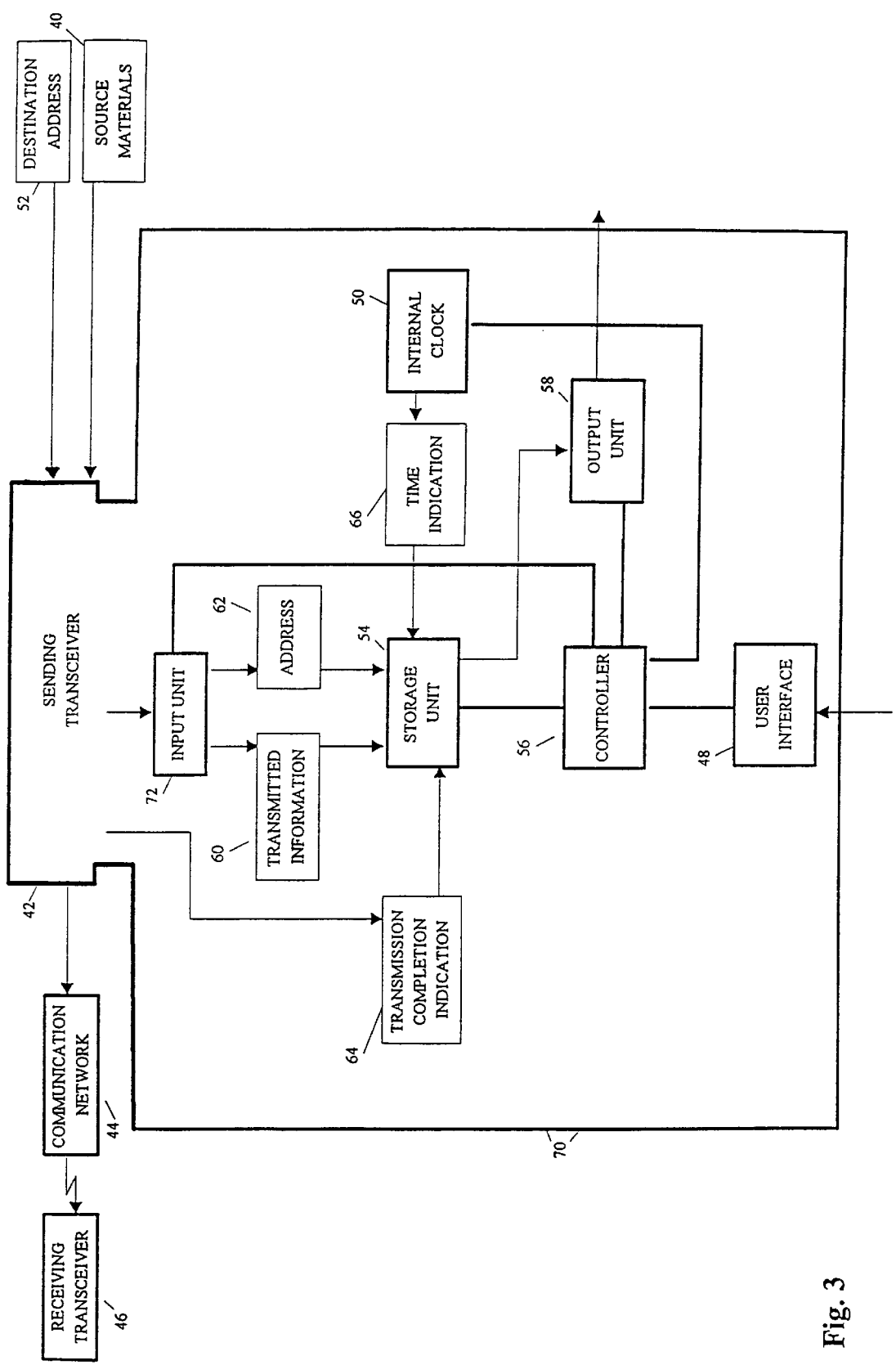
FIG. 3 is a schematic illustration of an alternative authenticator, constructed and operative in accordance with another preferred embodiment of the present invention.

As mentioned hereinabove, the authenticator 70 can form part of the sending transceiver 42. FIG. 3 illustrates such an embodiment, which is similar to that of FIG. 2 and similar functional elements have similar reference numerals.

In FIG. 3, the input unit 72 of the sending transceiver 42 comprises means, for example a serial, parallel or disk interface, for inputting the information 60 and the destination address 62 from any component of the sending transceiver 42, for example from its input devices. The sending transceiver 42 replaces the transceiver 76 of FIG. 2. The storage unit 54 however is optional, as the information 60 and the related dispatch information could be provided to the output unit 58 "on-the-fly" in a manner similar to that used by the "copy" function of document facsimile machines.

Generally, in various embodiments of the authenticator 70, the information 60 can be obtained from any source and by any means, including a computer, a disk drive, a scanner or any other component of the sending transceiver 42, a communication line, a communication network and any combinations thereof, and so forth.

It is appreciated that in accordance with the present invention, the various information elements can be provided, generated, associated or secured either by single, combined or separate means of the authenticator 70.

Furthermore, any information element having information content the substance of which is equivalent to that of the transmitted information can serve for authentication purposes, regardless of its form, representation, format or resolution, whether it is a paper document or electronic information, whether digital or analog, whether in form of dots and lines or alphanumeric, binary, hexadecimal and other characters, or whether it is encrypted, compressed or represented otherwise, and so forth. The element may contain additional information which does not change the substance and its content, such as a logo, a header message, etc. Furthermore, it may contain control, handshake and even noise data. Alternatively, an information descriptor such as a form number or name can be provided, and/or any other information content such as the form's filled-in data, which identifies the dispatched information.

Optionally, additional dispatch information may be provided to, or generated by authenticator 70, such as the number of pages transmitted, page numbers, the sender's identification, the sending transceiver's 42 identification, the receiving transceiver's 46 identification, the transmission elapsed time, a transmission identifier, integrity information such as a cyclic redundancy code (CRC), a checksum or the length of the transmitted information, an authenticator identification indication such as a serial number, a verification from the communication network 44 that the transmission has actually taken place at the specified time from the sender to the recipient's address, a heading message, a trailing message and so forth.

Typically, when the authenticator 70 comprises a reasonably secure storage unit 54, the stored information is retained therein and copies thereof are provided to the output unit 58. Preferably, the provided output or any part thereof is reasonably secured, so as to prevent any fraudulent action. For example, if the output is a printout, it can be secured by spreading invisible or other ink on it, or by using special ink, special print fonts or special paper to print the authentication-information, or in any other suitable manner. Another method includes securing the dispatch information using, for example, an encryption technique, and printing the encrypted information on the printout. At a later stage the encrypted information can be decrypted to provide the true dispatch information, and so forth. Likewise, mathematical association method as discussed hereinbelow can also be used.

It will be appreciated that the following embodiments fall within the scope of the present invention:

The authenticator of the present invention can operate for information, such as a document produced by a word processor, transmitted through a computer. In this embodiment, the computer may include the secure time generator (which may for example be externally plugged into the parallel port). The authenticator obtains the dispatch information from the transceiver, and the document is provided from the hard disk or word processing program. The authenticator encrypts the document and the dispatch information together and stores them in a file. When authentication is required, the authenticator retrieves the stored file, decrypts it and provides the document and the dispatch information associated therewith to a printer.

Similarly, information transmitted in a computer network or electronic mail system can be authenticated, for example, by having a file server or mail manager (whose time generator is considered secure) store the transmitted information together with its associated dispatch information in a secure manner. One embodiment of secure storage is that which has read-only privileges. Alternatively, such read-only effect can also be obtained by having the authentication-information encrypted with the authenticator's private key: everybody can decrypt it using the authenticator's public key, but no interested party can change it without such action being detectable.

The present invention can be operated in conjunction with a message transmission forwarding service such as that provided by Graphnet Inc. of Teaneck, N.J., USA. The service obtains the information and address from the sender, typically by an electronic transmission, occasionally converts it (for example from ASCII text or word processor format into a transmissible document format) and forwards it to the requested address. The forwarding service serves as the authenticator and may for example provide the dispatch information associated with the transmitted information to the sender in a secure manner, such as in a sealed envelope or in encrypted form.

An efficient method for associating a plurality of information elements is by associating a digital representation thereof using a method referred to herein as "mathematical association". A digital representation of an information element can be considered as a number, for example as the element's standard binary, hexadecimal or other base representation. Using mathematical association, rather than maintaining the information elements (numbers) themselves, it is sufficient to maintain the results (also numbers) of one or more functions which are applied to one or more of these information elements. (These results are sometimes referred to as "message-digests", "hash-values" or "digital-signatures"). More formally, if A is a set of information elements, and F is the mathematical association function, then the set B of information elements is obtained as the result of applying the function F to the set A of information elements, i.e. $B=F(A)$.

Preferably, the function F is selected such that a fraudulent attempt to change the elements of the set A, or an attempt to claim that a set A' which comprises different elements is the original set, can be readily detected by comparing the result B' obtained by applying the function F to the set A', to the original result B, i.e., by chekking if $F(A')=F(A)$.

It would be advantageous to select the function according to a cryptographic schemes. Encryption and digital envelope functions can provide for secure data interchange. Digital signatures can provide for accurate and reliable verification of both the signature generator and the data. one-way hash functions provides for security, and can reduce the size of the generated signatures while still enable verification of the original data used to generate these signatures. Utilizing combinations of cryptographic schemes can optimize particular implementations.

Various function classes of various degrees of complexity can be used for mathematical association purposes in accordance with various embodiments of the present invention. Furthermore, the function F and/or the result B can be kept secret and unknown in general, and to interested parties such as the sender or the recipient in particular. However, even if the function F and/or the result B are known, the task of finding a meaningful different set A' such that $B=F(A')$ is mostly very difficult even for relatively simple functions, not to mention for more complex ones.

A special class of functions most suitable for the purposes of the present invention is the class of functions having the property that given the result $B=F(A)$, it is exceptionally difficult to find a second set A' such that applying the function F to the second set A' will yield the same result B. The term "exceptionally difficult" refers herein to the fact that although many different such sets A' may exist, it is so difficult to find even one of them (sometimes even to find the set A itself) that it is practically infeasible. In fact, the functions of this class "hide" the elements they are applied to, (and sometimes the elements even cannot be reconstructed) and therefore this class is referred to herein as "the Hiding Class".

There are many advantages to using mathematical association in general, and functions of the Hiding Class in particular:

(a) It is efficient, for example for saving storage space and transmission bandwidth, to maintain a function result, the size of which is normally very small as compared to the original information elements themselves which can be arbitrarily large.

(b) It provides security, since the result is cryptic and there is no need to secure the information elements themselves. Furthermore, it is difficult, and sometimes infeasible to reconstruct the original elements.

(c) It provides a clear indication as to the authenticity of the elements of the set A used by the function to generate the result B. At any later time, the result B' obtained by applying the function F to a purported set A' can be compared to the original result B, and a match indicates beyond any reasonable doubt that set A' is same as the original set A. Moreover, integrity information such as the length of the information elements of the set A can be added and used as part of the set A, or the results of a plurality of functions can be maintained such that to make the task of finding such a different set A' infeasible.

(d) The result B' provided for comparison must be equal to the original result B, since any change to A will yield a different result B' with very high probability, and even if by chance a different set A' is found for which F(A')=B, the chance that it will be meaningful or will have the same length is practically zero.

(e) The function can be selected such that it is relatively easy and fast to compute the function result.

Few well known and widely used functions of the Hiding class are encryption functions (e.g., the RSA [1.06] or the DES [1.01] algorithms) and Cyclic-Redundancy-Check [3] (C.R.C.) functions (e.g., the C.R.C-32 function). While C.R.C functions are generally used in applications requiring verification as to the integrity of an arbitrarily long block of data, encryption is used to maintain the original data elements, though in different, cryptic representation. Encryption functions convert the information elements into one or more cryptic data blocks using one key, while enabling their reconstruction by providing a matching (same or different) key. Other well known members of this class of functions in the prior art are compression functions (e.g., the Lempel-Ziv 1977 [5] and 1978 algorithms), one-way hash functions [1.03] (e.g., the MD4 [4], and MD5 [1.04] algorithms), and MACs [1.13].

Since for authentication purposes there is no need to maintain the original information elements, the use of encryption functions (which normally maintain the information though in a cryptic representation) may be inefficient. One-way hash functions (and other functions of the Hiding Class), on the other hand, maintain a small sized result value, but the information elements from which the result has been produced are secured, i.e., cannot be reconstructed therefrom. It would be more advantageous, for example, to apply a one-way hash function to the union of all the information elements, i.e., to a bit-string, where the leftmost bit is the leftmost bit of the first element, and the rightmost bit is the rightmost bit of the last element. This produces a cryptic and secure result, as described hereinabove. Furthermore, one-way hash functions can be computed relatively quickly and easily.

Generally and more formally, the result B is a set of one or more information elements b1, ..., bm, where each element bi (which itself can comprise one or more information elements) is the result of applying a (possibly different) function Fi to a subset Si of a set A which comprises one or more information elements a1, ..., an, where the various subsets Si are not necessarily disjoint or different, each subset Si includes at least a portion of one or more (or even all) of the electronic information elements of the set A, and where each function Fi can comprise one or more functions (i.e., Fi can be the composition of functions). Preferably, the functions Fi are members of the Hiding Class. The elements of such a subset Si are considered to be mathematically associated.

Assuming that the set A comprises five information elements a1, a2, a3, a4, a5, a few examples of mathematical association function Fi and their result set B follow: (the UNION function is denoted as U(x1, ..., xk), which is an information element comprising a bit-string, where the leftmost bit is the leftmost bit of the element x1, and the rightmost bit is the rightmost bit of the element xk.)

(a) single element result set B $$b1=F1(S1)=F1(a1,a4,a5)=a1/(a4+a5+1)$$

$$b1=F1(S1)=F1(a1,a3,a4)=\text{ENCRYPT}(U(a1,a3,a4))$$

$$b1=F1(S1)=F1(a1,a2,a3,a4,a5)=MD5(U(a1,a2,a3,a4,a5))*C.R.C(a3)\bmod 5933333$$

$$b1=F1(S1)=F1(a1,a2,a3,a4,a5)=C.R.C(\text{ENCRYPT}(U(a1,a2)),\text{COMPRESS}(U(a2,a3,a4)),a1,a5)$$

$$b1=F1(S1)=F1(a1,a2,a3,a4,a5)=U(a1,a2,a3,a4,a5)\bmod p (\text{where } p \text{ is a large Prime number})$$

$$b1=F1(S1)=F1(a1,a2,a3,a4,a5)=\text{ENCRYPT}(MD5(U(a1,a2,a3,a4,a5)))$$

(b) multi-element result set B $$B=[C.R.C(U(a1,a3)),a2/(a1+1),\text{ENCRYPT}(a5)]$$

$$b1=F1(S1)=F1(a1,a3)=C.R.C(a1,a3)$$

$$b2=F2(S2)=F2(a1,a2)=a2/(a1+1)$$

$$b3=F3(S3)=F3(a5)=\text{ENCRYPT}(a5)$$

The elements of two or more (not necessarily disjoint) subsets of set A can be associated with each other by associating the elements of the result set B which correspond to these subsets, either mathematically, or by non-mathematical methods, as described hereinabove. Furthermore, if there is a subset of elements of set A to which no function has been applied, these elements may be associated with the elements of the result set B, again either mathematically or by non-mathematical methods.

Moreover, the elements of two or more subsets of the set A can be associated with each other by associating the elements of each of these subsets with a common subset comprising one or more elements of the set A, where this common subset uniquely relates to the specific dispatch. This type of association is referred to herein as "indirect association", and the elements of this common subset are referred to herein as "link elements". A link element can be for example a unique dispatch number, or the subset comprising the time indication and a machine serial number, etc.

For example, assuming that the element a2 of the above set A uniquely relates to the dispatch, the following function generates a multi-element result set B:

$B=[b1,b2,b3]=[\text{ENCRYPT}(a1,a2), \text{COMPRESS}(a2,a3,a4), a2+a5]$ where the subsets Si include the following elements: S1=[a1,a2], S2=[a2,a3,a4] and S3=[a2,a5]. The elements of each subset are mathematically associated. Since all of these subsets include the common link-element a2, all their elements (in this case all the elements of the set A) are associated with each other.

Figure 4:
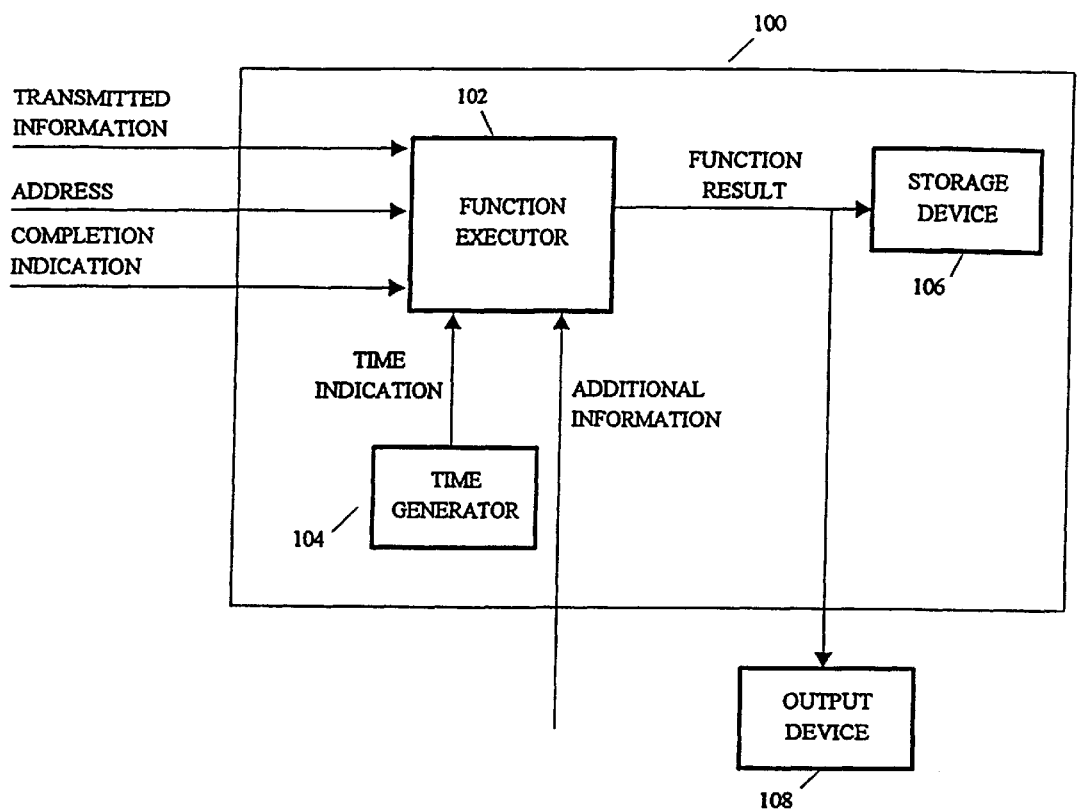
FIG. 4 is a schematic illustration of an alternative authenticator, constructed and operative in accordance with additional preferred embodiment of the present invention

Reference is now made to FIG. 4 which is a block diagram that illustrates an authenticator 100, constructed and operative in accordance with a preferred embodiment of the present invention. The authenticator 100 comprises a secure time generator 104, a storage device 106 and a function executor 102 which has means for inputting the following information elements: the transmitted information, the destination address, a time indication generated by the secure time generator 104, and a dispatch completion indication. Optionally, additional information elements can be provided as well.

The function executor 102 can be for example a Microchip Technology Inc.'s PIC16C5x series EPROM-based micro-controller, and the input means can be for example an I/O port, a serial, parallel or disk interface. The function executor 102 is capable of executing a function F on at least one, and preferably on the union of all of the input elements, and of generating a result information element which is provided to a storage device 106, and optionally to an output device 108, such as a printing device.

Preferably, the function F is a member of the Hiding Class, and is kept unknown at least to any interested party, by the function executor 102. This can be achieved for example by enabling the code protection feature of the PIC16C5x series microcontroller. Alternatively, a MAC [1.13] such as a one-way hash function MAC can be used where secret codes, keys and data relating to the function can be for example stored in a shielded memory device which is automatically erased if the authenticator 100 is tampered with. Also, preferably the storage device 106 is a WORM device, such as a PROM. Preferably, a different function is used for each device employing the function F. This can be achieved for example by using different keys or codes with each function.

In accordance with one embodiment of the present invention, the authenticator further comprises a verification mechanism for verifying the authenticity of a set of information elements purported to be identical to the original set of information elements. It is however appreciated that the verification mechanism can be separated therefrom.

Figure 5:
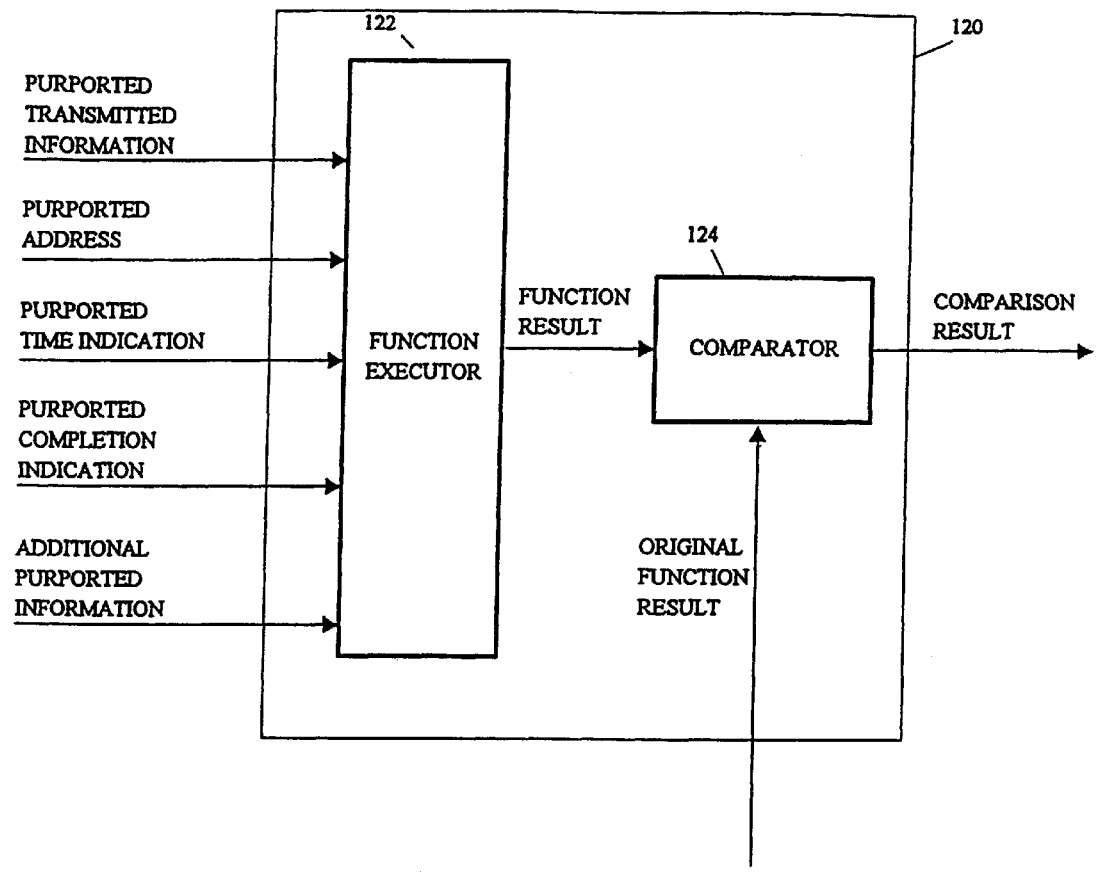
FIGS. 5 and 6 are schematic illustrations of verification mechanisms constructed and operative in accordance with the authenticator of FIG. 4.

Reference is now made to FIG. 5 which is a block diagram that illustrates a verification mechanism 120, constructed and operative in accordance with a preferred embodiment of the present invention, where at least part of the information elements were mathematically associated by the authenticator 100 of FIG. 4.

The verification mechanism 120 includes a function executor 122 for generating a new result information element according to the same function employed by the function executor 102 of FIG. 4. The function executor 122 has means for inputting information elements corresponding to the original information elements input to the function executor 102 of FIG. 4., and which are purported to be identical to those original elements.

The verification mechanism 120 also comprises a comparator 124, which has input means for inputting the newly generated result information element and the original result information element which may be obtained from the storage device 106 of FIG. 4, or manually, for example through a keyboard. The comparator 124 then compares the two provided result information elements to determine if they are the same, and the comparison result can be output for example to a display or printing unit. A match indicates that the purported information elements are authentic.

Figure 6:
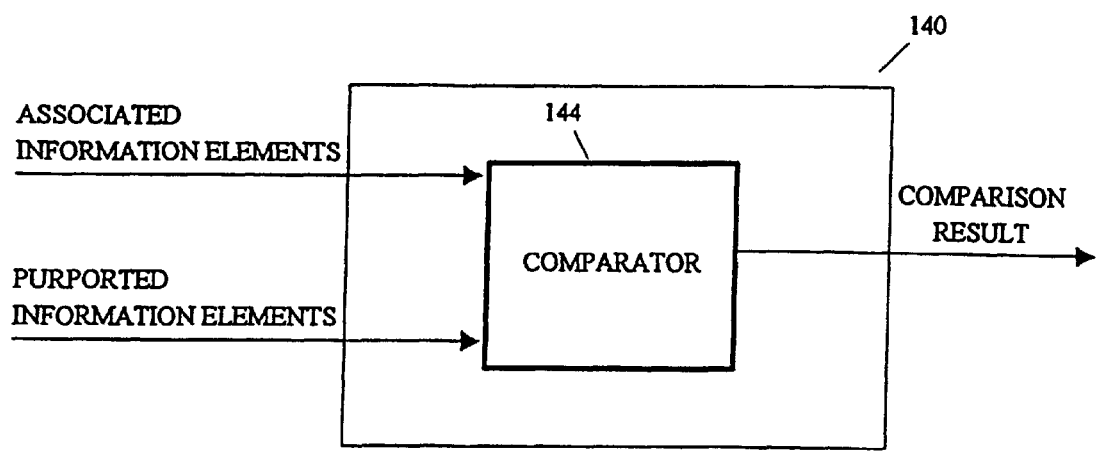

Reference is now made to FIG. 6 which is a block diagram that illustrates a verification mechanism 140, constructed and operative in accordance with a preferred embodiment of the present invention, where the information elements were associated non-mathematically, and are for example stored in storage unit 54 by the authenticator 70 of FIG. 2.

The verification mechanism 140 comprises a comparator 144, which has input means for inputting at least one of the stored associated information elements from the storage unit 54 of FIG. 2. The comparator 124 also has input means for inputting the corresponding information elements purported to be identical to the stored elements. The comparator 124 then compares the corresponding information elements to determine if they are the same, and the comparison result can be output for example to a display or printing unit. A match of all the compared elements indicates that the purported information elements are authentic.

It is appreciated that various embodiments of the present invention can include a combination of the verification mechanisms described hereinabove.

Also, part of the securing methods which were described for FIG. 2 include for example encryption and compression methods which formally relate to mathematical association functions such as ENCRYPT(a1, . . . , aj) and COMPRESS (a1, . . . , aj). Occasionally, there is a need for reconstructing some or all of the secured mathematically associated information elements, for example for providing them to an output unit or to the comparator of the verification mechanism. Since some compression and encryption functions (as some other functions) are reversible, they are typically used when reconstruction of the elements is needed. (A function G is considered reversible if there exists a function H such that $H(G(x))=x$, and the function H is called the inverse function of G).

As discussed hereinabove, a mathematical association function can generally comprise a single function, or the composition of two or more functions. For example, the function ENCRYPT(a1, . . . , aj) comprises a single function ENCRYPT, which is reversible, and its inverse function is DECRYPT. Another function COMPRESS (ENCRYPT(a1), C.R.C(a2, . . . , aj)) is the composition of three functions—COMPRESS, ENCRYPT and C.R.C, where the first two are reversible and their inverse function are DECOMPRESS (which yields the set comprising ENCRYPT(a1) and C.R.C (a2, . . . , aj)), and DECRYPT (which yields the element a1) respectively. The C.R.C function however, is not reversible.

Formally, if a function Fi comprises one or more functions, some of which are reversible, a set C comprising one or more information elements c1, . . . , ck can be generated, where this set C is expressive as a function I applied to the result information element bi of the function Fi, where this function I comprises the inverse function of one or more of these reversible functions.

While the authentication methods described hereinabove refer mostly to symmetric digital signatures, a preferred authentication method may be obtained using public-key digital signatures. A major advantage of public-key digital signatures over symmetric digital signatures is that they enable any third party (such as a judge), to verify the authenticity of both the data and the signer (where by using symmetric digital signatures, only a designated authenticator such as a secure device or a trusted third party, which have knowledge of the function, secret keys/codes etc., can perform the verification). The data is guaranteed not to be tampered with, and furthermore, once the data is signed, the signer is actually "committed" to it and cannot later repudiate his commitment to the digitally signed data, for only the signer which has sole knowledge of his private key could have created the signature, thus allowing such data to be legally binding.

Typically, public-key digital signatures generation and data authentication in performed in the following manner: a computation involving the signer's private key and the data, which can comprise various elements such as the dispatched message, the time indication, the destination address, and so forth is performed; the output is the digital signature, and may be attached to the data or separated therefrom. In later attempt of verification of the data, some computation involving the purported data, the signature, and signer's public key is performed. If the results properly hold in simple mathematical relation, the data is verified as genuine; otherwise, it may be forged or may have been altered or otherwise tampered with.

Since the signing process using the whole (plain) data is generally time consuming and the signature consumes a considerable amount of storage space, typically a relatively unique representation (also called a "fingerprint" or the "message digest") of the data is first generated using a process in which the data is "condensed" or "hashed", for example by means of a one-way hash function into a relative small value, thereby fixing its contents, and the signing process is performed on the fingerprint, resulting in an equivalent effective authentication. Therefore, the term digital signature herein refers to the digital signature of either the plain data element(s) or of any representation (function) thereof.

As described hereinabove, the fingerprint of a series of data elements can be generated thereby fixing their contents and associating them with each other. Since public-key digital signatures belong to the "Hiding Class", and since they further own the property that they can be generated with one key (such as the private key), and provide for later non-repudiable verification using another matching key (such as the public key), the usage of such functions for the purposes of the present invention is therefore of great advantage.

Figure 7:
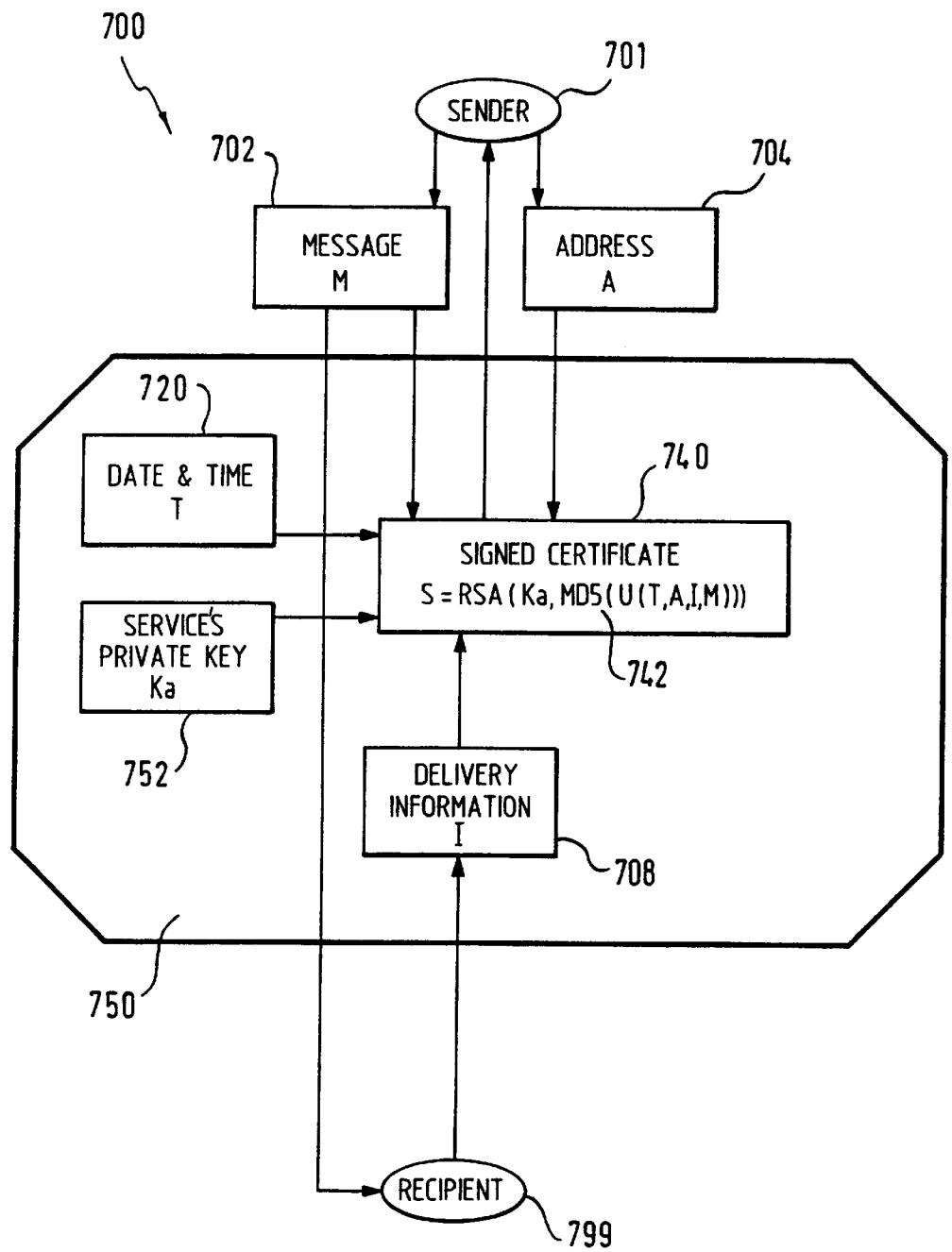
FIG. 7 is a schematic illustration of an alternative authenticator, constructed and operative in accordance with yet another preferred embodiment of the present invention.

Reference is now made to FIG. 7 which is a block diagram that illustrates an E-Mail system 700, and a message dispatch and authentication service 750, constructed and operative in accordance with a preferred embodiment of the present invention. The sender 701 provides the E-Mail message 702 and the recipient's 799 E-Mail address 704 to the message dispatch and authentication service 750. Without limiting the generality, although reference is made to E-Mail dispatching services and systems in general, it is appreciated that implementations relating to the embodiments described herein can be easily extended, modified, ported or derived therefrom to other electronic data dispatch systems.

The dispatched message 702 may comprise any digital data such as text, pictorial, graphic, audio and video data, any number of files etc., in any form or representation e.g., compressed, encrypted, plaintext etc. Preferably, the message 702 includes the sender's 701 digital signature, which the sender can generate by means of his private key, in order to establish the sender's "commitment" to the message 702, and to provide for verification of the message and sender as the message originator, any third party using the sender's public key.

Digital signatures can be generated in system 700 for example by means of a verifiable public-key algorithm such as RSA or DSA. Fingerprints can be generated for example by means of a one-way hash function such as MD4 or MD5.

The service 750 forwards the message 701 to the recipient 799 using the address 704. The service 750, preferably after assuring that the message has been successfully delivered, adds (e.g., appends) a dispatch time indication 720 to the message 702 and the address 704, as well as information 708 indicating the success (or failure) of the message delivery. Obviously, additional dispatch information elements, such as a sequential dispatch number, the sender, recipient and the service identification information and so forth may be added as well.

The service 750 then associates the above data elements for example by generating their fingerprint, which is then signed using the service's private key 752, to produce the service's signature 742. signing the fingerprint can reduce the resulting signature 742 computation time, transmission bandwidth and storage space. The service then provides back to the sender 701 a service's generated certificate 740 comprising the service's signature 742 and optionally various dispatch information elements from which it has been generated (there is no need to provide the message 702 and address 704 since they are already with the sender 701), thus the certificate 740 is typically tiny.

Thus, for example, using RSA to generate the signature, if M is the dispatched message 702, A is the address 704, T is the time indication 720, I is the delivery information 708, and Ka is the authentication service's RSA private key, then the following is a sample calculation of S—the signature 742:

$$S=RSA(MD5(U(T,I,M,A)),Ka)$$

The certificate 740, which comprises the service's digital signature for the dispatch transaction, constitutes an non-repudiable evidence witnessed by the service for the dispatch and its contents, since the dispatched message contents is securely associated with the dispatch information (by means of the service's generated signature and/or fingerprint), and since the signature, the message and the dispatch information can at any later time be authenticated and verified by any third party both for integrity and originality by means of the service's public key (and if the message has also been signed by the sender, it can further be verified in the same manner using the sender's public key).

Thus, for example if PBKa is the service's public key, then by providing the above signature S—the purported message M', time indication T', address A' and delivery information I', can be authenticated by verifying that the following relation holds:

$$RSA(S,PBKa)=MD5(U(T',I',M',A'))$$

To increase the credibility of the system, a record of the certificate 740 can be kept with the service, and furthermore, a copy of the certificate 740 can be provided for storage to one or more trustees, such as a designated authority, or law and/or public accounting firms. Alternatively, the certificate 740 may itself be signed by one or more trustees, using their private keys.

A related embodiment can utilize a Time Stamping Service (TSS) such as the Digital Notary System (DNS) provided by Surety Technologies Inc. [1.10], which has been proposed by Haber et al. in their U.S. patent documents [2]. The certificate 740 or any portion thereof (such as the signature 742) can be sent to the DNS to be time stamped. Alternatively, an embodiment of the present invention could internally implement the DNS scheme. The DNS generates a certificate authenticating the certificate 740. Utilizing such time stamping schemes is of great advantage, since the DNS generated certificates are virtually unforgeable, and there is no need to deposit copies of the certificates with trustees. Since in this case the DNS time stamps the certificate 740 anyway, the service 750 itself optionally need not add the time indication 720.

Thus, for example, if C is the certificate 740 (not including the time indication 720), which comprises A, I, N and S (as defined above), and T is the time indication added by the DNS, then DNSC—the DNS generated certificate may be calculated as follows:

$$DNSC=DNS(C,T)$$

As mentioned above, the message 702 is preferably digitally signed with the sender's 701 private key, to enable authentication of the sender's identity as the message originator using the sender's public key, to establish the sender's non-repudiable commitment to the message, and to verify the message integrity.

Nevertheless, any other method can be used for identification and/or authentication of the sender, though such methods can sometimes be more vulnerable or less effective. One embodiment for example could utilize an hardware component (preferably secured) with the sender's unique identification information "burned-into". In another embodiment the service 750 can utilize various log-in procedures to identify and authenticate the sender when he logs-in to obtain service. Sample authentication protocols and schemes are described in [1.09] and [1.11].

Likewise, the identity of the recipient's 799 of the message can be authenticated in similar manners. This is useful for example when both the sender and the recipient log-into the same dispatch service for E-Mail transactions. However, the message 702 is frequently delivered to another E-Mail server (acting as the recipient's agent, where the recipient later logs-in, identifies himself and downloads his messages) rather than to the recipient himself.

In such embodiments, it might be sufficient to obtain proof of delivery from the receiving server, for example in form of a server's digitally signed certificate, which may for example comprise the server's identification information, a dispatch identifier, the recipient's address and preferably the message and so forth (or a fingerprint thereof) while assuming that the message will eventually reach the recipient. Alternatively, a later proof of the final delivery may be obtained from that receiving server. Such delivery details as described above may be included in the delivery information 708.

In order to avoid potential disputes, as for example in case of contractual E-Mail correspondence, it may be useful to back up such correspondence by an agreement where the parties agree that delivery indication provided by the recipient's agent is to be considered an acceptable proof of delivery to the recipient. Alternatively, it may be agreed that multiple (two, three or more times of) certified dispatches of the message to be considered an acceptable proof of delivery and so forth.

In one preferred embodiment, the recipient (or its agent) may provide a counter-signature (using his private key) for the message, the sender's digital signature of the message, or the service's certificate or for any portions thereof. This may provide an ultimate evidence for the message dispatch, its contents, its time and its delivery to its destination. Thus if Ks, Kr, Ka are the private keys of the sender, the recipient (or his agent) and the authentication service 750 respectively, M is the dispatched message 702, T is the time indication 720, N is a sequential dispatch number, IDs and IDr are the identification information of the sender and recipient respectively, and A is the recipient's address 704, then the following sample calculations of S—the signature 742 can be performed:

$$S=RSA(Ka,MD5(U(N,A,T,M,IDs,IDr))) \quad 1.$$

$$S=RSA(Ka,MD5(U(T,M,M',R))) \quad 2.$$

$$S=RSA(Ka,MD5(U(N,T,A,M,M',R''))) \quad 3.$$

$$S=RSA(Ka,MD5(U(T,M',R))) \quad 4.$$

$$S=DNS(T,MD5(U(M',R))) \quad 5.$$

where $$M'=RSA(Ks,MD5(M))$$

$$R=RSA(Kr,MD5(U(M,N)))$$

$$R'=RSA(Kr,M')$$

$$R''=RSA(Kr,N)$$

Such incorporation of identification information relating to the sender 701, the recipient 799 or both (either by means of their digital signature, or otherwise) in the certificate generated by the service 750, can provide for more complete authentication of the entire dispatch transaction, and can be used as evidence for the dispatch and its contents by both the sender and the recipient.

BIBLIOGRAPHY AND REFERENCES

[1] "Applied Cryptography (2nd Edition)", (Schneier Bruce, John Wiley & Sons, 1996).
- [1.01] see [1] Chapter 12, pp. 265–301.
- [1.02] see [1] Chapter 13 Section 13.9, pp. 319–325.
- [1.03] see [1] Chapter 18 Section 18.1, pp. 429–431.
- [1.04] see [1] Chapter 18 Section 18.5, pp. 436–441., see also "One-Way Hash Functions," (B. Schneier, Dr. Dobb's Journal M&T Publishing Inc., September 1991 Vol 16 No.9 pp. 148–151), see also Internet Request For Comments (RFC) document 1321.
- [1.05] see [1] Chapter 19 Section 19.1, pp. 461–462.
- [1.06] see [1] Chapter 19 Section 19.3, pp. 466–474, see also "A Method for Obtaining Digital Signatures and Public-Key Cryptosystems" (Rivest, R. L., A. Shamir, and L. Adelman, Communications of the ACM, ACM Inc., February 1978 Vol 21 No. 2, pp. 120–126).
- [1.07] see [1] Chapter 20 Section 20.1, pp. 483–494, see also "The Digital Signature Standard proposed by the National Institute of Standards and Technology" (Communications of the ACM, ACM Inc., July 1992 Vol 35 No. 7 pp. 36–40),
- [1.08] see [1] Chapter 24 Section 24.12, pp. 584–587.
- [1.09] see [1] Chapter 3 Section 3.2, pp. 52–56.
- [1.10] see [1] Chapter 4 Section 4.1, pp. 75–79.
- [1.11] see [1] Chapter 21, pp. 503–512.
- [1.12] see [1] Chapter 2, Sections 2.6–2.7, pp. 34–44, see also [1] Chapter 20, pp. 483–502.
- [1.13] see [1] Chapter 18, Section 18.4, pp. 455–459.

[2] U.S. Pat. Nos. 5,136,646, 5,136,647, and 5,373,561.

[3] "Cyclic Redundancy Checksums (Tutorial)" (Louis, B. Gregory, C Users Journal, R & D Publications Inc., Oct 1992 v10 n10 p55 (6)), see also "File verification using C.R.C." (Nelson, Mark R., Dr. Dobb's Journal, M&T Publishing Inc., May 1992 Vol 17 No. 5 p64(6)).

[4] "The MD4 Message Digest Algorithm" (R. L. Rivest, Crypto '90 Abstracts, August 1990, pp. 301–311, Springer-Verlag).

[5] "A Universal Algorithm for Sequential Data Compression" (Ziv. J., Lempel A., IEEE Transactions On Information Theory, Vol 23, No. 3, pp. 337–343).

The references and publications described by the above-mentioned articles are incorporated herein by reference.

While the present invention has been described with reference to a few specific embodiments, the description is illustrative of the invention as defined by the claims.

What is claimed is:

1. Apparatus for authenticating that certain information has been transmitted from a sender via a dispatcher to a recipient, the apparatus comprising:

means for providing a set A comprising a plurality of information elements a1, . . . , an, where said information element a1 is originated from the sender and comprising the contents of the information being electronically transmitted to said recipient, and said one or more information elements a2, . . . , an comprising dispatch-related information and comprise at least the following elements:

a2—a time indication associated with said dispatch; and a3—information describing the destination of said dispatch, and wherein at least said information element a2 is provided in a manner that is resistant to or indicative of tampering by either of said sender and said recipient; and an authenticator functioning as a non-interested third party with respect to the sender and the receiver and having (1) means for associating said dispatch-related information with said element a1 by generating authentication-information comprising a representation of at least said elements a1, a2 and a3, said representation comprising a set of one or more elements, each comprising a representation of one or more elements of said set A; and (2) means for securing at least part of said authentication-information against tampering of said sender and recipient;

wherein at least one of the means for associating and for securing comprises means for generating a new set B, said set B comprising one or more information elements b1, . . . bm, each element bi comprising a representation of a subset Si, said representation being expressive as a function Fi of the elements of said subset Si, where said subset Si comprises a digital representation of at least one element of said set A, and where said functions Fi can be different.

2. Apparatus according to claim 1, wherein said element a2 comprises at least one element selected from the group consisting of the date associated with said dispatch, and the time associated with said dispatch.

3. Apparatus according to claim 1 or 2, wherein said dispatch-related information comprises at least one element selected from the group consisting of a delivery indication associated with said dispatch, the number of pages transmitted, page numbers, an indication of identification associated with said sender, an indication of identification associated with said recipient, said dispatch duration, integrity information, an indication of dispatch identification associated with said dispatch, an indication of identification associated with said apparatus, a heading message, and a trailing message.

4. Apparatus according to claim 1, wherein the elements of said authentication-information have a form selected from the group consisting of the following forms: a paper document, microfiche and electronic information, and where each of said elements can have different form.

5. Apparatus according to claim 1, wherein said element a1 is provided from the sender by electronic means.

6. Apparatus according to claim 1, wherein said authentication-information comprises a representation of at least part of said new set B.

7. Apparatus according to claim 5, wherein said electronic means comprises a combination of at least one of the following: a communication network, a scanning device, a dispatcher, and a computer.

8. Apparatus according to claim 1 or 7, wherein said dispatcher comprises at least one element selected from the group consisting of a facsimile machine, a modem, a network interface card (NIC), a computer, a communication line, a communication network, an E-Mail system, an EDI system, and a message transmission forwarding service.

9. Apparatus according to claim 1, comprising means for authenticating the identity of at least one member selected from the group consisting of said sender, said recipient, an agent of said sender, and an agent of said recipient.

10. Apparatus according to claim 1, comprising means for providing said dispatched information to said dispatcher for electronic transmission to said recipient.

11. Apparatus according to claim 1 wherein the apparatus is combined in whole or in part with said dispatcher.

12. Apparatus according to claim 1, and comprising means for generating selected elements of said set A.

13. Apparatus according to claim 1, wherein said element a3 comprises at least one element selected from the group consisting of an address associated with said dispatch, an address associated with said recipient, and an indication of identification associated with said recipient.

14. Apparatus according to claim 3, wherein said delivery indication comprises an indication of identification associated with said recipient.

15. Apparatus according to claim 1, comprising means for providing an output comprising a representation of at least part of said authentication-information.

16. Apparatus according to claim 1, wherein said means for securing comprises secure storage means for storing at least part of said authentication-information.

17. Apparatus according to claim 1, wherein at least one member selected from the group consisting of said function Fi and at least one information element of said new set B, is unknown at least to said sender.

18. Apparatus according to claim 1 or 17, wherein said new set B comprises a verifiable digital signature of said subset Si.

19. Apparatus according to claim 18, comprising a corresponding verification means for said verifiable digital signature, for authenticating at least one of the following: at least one element of said subset Si, and the originator of said digital signature.

20. Apparatus according to claim 1, or 13, wherein said set A comprises a link information element through which other elements selected from the group consisting of said set A and the authentication-information are linked.

21. Apparatus according to claim 1, wherein said function Fi has the property that it is substantially difficult to find a set S' comprising at least one information element, said set S' being different from said subset Si and yet can be used instead, such that applying said function Fi to said set S' will yield said element bi, i.e., such that Fi(S')=bi.

22. Apparatus according to claim 1, wherein said function Fi comprises at least one reversible function, comprising means for generating a set C which comprises one or more information elements c1, . . . , ck, where said set C is expressive as a function I of at least part of said information element bi, and said function I comprising the inverse function of said reversible function .

23. Apparatus according to claim 1, comprising means for verifying the authenticity of an information element asserted to match a corresponding element of said set A, said verification means comprising means for comparing a representation of said information element asserted with a representation of at least part of said authentication-information to determine if they match.

24. Apparatus according to claim 1, comprising means for verifying the authenticity of a set Si' comprising one or more information elements which are asserted to match the corresponding elements of said subset Si, said verification means comprising:
    means for generating a new information element bi' comprising a representation of said set Si' which is expressive as said function Fi of the elements of said set Si'; and
    means for comparing a representation of said element bi' with a representation of said element bi to determine if they match.

25. Apparatus according to claim 1, wherein said function Fi comprises one or more functions.

26. Apparatus according to claim 18, wherein said digital signature is generated according to a scheme selected from the group consisting of secret-key (symmetric) cryptosystems and public-key cryptosystems.

27. Apparatus according to claim 1, wherein said new set B comprises an element generated according to a Time Stamping Service scheme.

28. Apparatus according to claim 1, wherein the means for associating is combined with the means for securing.

29. Apparatus according to claim 1, wherein said apparatus is associated with a party other than said sender, or is resistant to or indicative of tampering by at least said sender.

30. A method for authenticating that certain information has been transmitted from a sender via a dispatcher to a recipient, comprising the steps of:
    providing a set A comprising a plurality of information elements a1, . . . , an, where said information element a1 is originated from the sender and comprising the contents of the information being electronically transmitted to said recipient, and said one or more information elements a2, . . . , an comprising dispatch-related information and comprise at least the following elements:
    a2—a time indication associated with said dispatch; and
    a3—information describing the destination of said dispatch,
    and wherein at least said information element a2 is provided in a manner that is resistant to or indicative of tampering by either of said sender and said recipient;
    associating, by an authenticator functioning as a non-interested third party with respect to the sender and the recipient, said dispatch-related information with said element a1 by generating authentication-information comprising a representation of at least said elements a1, a2 and a3, said representation comprising a set of one or more elements, each comprising a representation of one or more elements of said set A; and
    securing, by said authenticator, at least part of said authentication-information against tampering of said sender and recipient;
    wherein at least one of the steps of associating and securing comprises the step of generating a new set B, said set B comprising one or more information elements b1, . . . , bm, each element bi comprising a representation of a subset Si, said representation being expressive as a function Fi of the elements of said subset Si, where said subset Si comprises a digital representation of at least one element of said set A, and where said A functions Fi can be different.

31. A method according to claim 30, wherein said dispatch-related information comprises at least one element selected from the group consisting of a delivery indication associated with said dispatch, the number of pages transmitted, page numbers, an indication of identification associated with said sender, an indication of identification associated with said recipient, said dispatch duration, integrity information, an indication of dispatch identification associated with said dispatch, an indication of identification associated with said authenticator, a heading message, and a trailing message.

32. A method according to claim 30, comprising the step of authenticating the identity of at least one member selected from the group consisting of said sender, said recipient, an agent of said sender, and an agent of said recipient.

33. A method according to claim 30, wherein the elements of said authentication-information have a form selected from the group consisting of the following forms: a paper document, microfiche and electronic information, and where each of said elements can have different form.

34. A method according to claim 30, wherein said element a1 is provided from the sender by electronic means.

35. A method according to claim 34, wherein said electronic means comprises a combination of at least one of the following: a communication network, a scanning device, a dispatcher, and a computer.

36. A method according to claim 30 or 35, wherein said dispatcher comprises at least one element selected from the group consisting of a facsimile machine, a modem, a network interface card (NIC), a computer, a communication line, a communication network, an E-Mail system, an EDI system, and a message transmission forwarding service.

37. A method according to claim 30, wherein said authentication-information comprises a representation of at least part of said new set B.

38. A method according to claim 30, comprising the step of providing said dispatched information to said dispatcher for electronic transmission to said recipient.

39. A method according to claim 30, wherein said element a2 comprises at least one element selected from the group consisting of the date associated with said dispatch, and the time associated with said dispatch.

40. A method according to claim 30, comprising the step of generating selected elements of said set A.

41. A method according to claim 30, wherein said element a3 comprises at least one element selected from the group consisting of an address associated with said dispatch, an address associated with said recipient, and an indication of identification associated with said recipient.

42. A method according to claim 31, wherein said delivery indication comprises an indication of identification associated with said recipient.

43. A method according to claim 30, comprising the step of electronically transmitting said dispatched information to said recipient.

44. A method according to claim 30, comprising the step of providing an output comprising a representation of at least part of said authentication-information.

45. A method according to claim 44, wherein said step of providing an output provides said output to a party selected from the group consisting of said sender, said recipient, an arbitrator, and a legal authority.

46. A method according to claim 30, wherein the step of securing stores at least part of said authentication-information in a secure storage device.

47. A method according to claim 30, wherein at least one member selected from the group consisting of said function Fi, and at least one information element of said new set B, is unknown at least to said sender.

48. A method according to claim 30 or 47, wherein said new set B comprises a verifiable digital signature of said subset Si.

49. A method according to claim 48, comprising a corresponding verification step for said verifiable digital signature, for authenticating at least one of the following: at least one element of said subset Si, and the originator of said digital signature.

50. A method according to claim 30, or 41, wherein said set A comprises a link information element through which other elements selected from the group consisting of said set A and the authentication-information are linked.

51. A method according to claim 30, wherein said function Fi has the property that it is substantially difficult to find a set S' comprising at least one information element, said set S' being different from said subset Si and yet can be used instead, such that applying said function Fi to said set S' will yield said element bi, i.e., such that Fi(S')=bi.

52. A method according to claim 30, wherein said function Fi comprises at least one reversible function, comprising the step of generating a set C which comprises one or more information elements c1, . . . , ck, where said set C is expressive as a function I of at least part of said information element bi, and said function I comprising the inverse function of said reversible function.

53. A method according to claim 30, comprising the step of verifying the authenticity of an information element asserted to match a corresponding element of said set A, said verification step comprising the step of comparing a representation of said information element asserted with a representation of at least part of said authentication-information to determine if they match.

54. A method according to claim 30, comprising the step of verifying the authenticity of a set Si' comprising one or more information elements which are asserted to match the corresponding elements of said subset Si, said verification step comprising the steps of:
 generating a new information element bi' comprising a representation of said set Si' which is expressive as said function Fi of the elements of said set Si'; and
 comparing a representation of said element bi' with a representation of said element bi to determine if they match.

55. A method according to claim 30, wherein said function Fi comprises one or more functions.

56. A method according to claim 48, wherein said digital signature is generated according to a scheme selected from the group consisting of secret-key (symmetric) cryptosystems and public-key cryptosystems.

57. A method according to claim 30, wherein said new set B comprises an element generated according to a Time Stamping Service scheme.

58. A method according to claim 30, wherein the step of associating is combined with the step of securing.

59. A method according to claim 30, wherein the activities described by said steps are being performed by an authenticator, said authenticator being associated with a party other than said sender.

60. A method of authenticating a dispatch and contents of the dispatch transmitted from a sender to a recipient, comprising the steps of:
 receiving content data representative of the contents of the dispatch originated from the sender and being electrically transmitted to said recipient, and a destination of the dispatch;
 providing an indicia relating to a time of transmission of the dispatch, said time related indicia being provided in a manner resistant to or indicative of tampering by either of the sender and the recipient;
 associating, by an authenticator functioning as a non-interested third party with respect to the sender and the recipient, the content data with dispatch record data which includes at least said time related indicia and an indicia relating to the destination of the dispatch, to generate authentication data which authenticate the dispatch and the contents of the dispatch; and
 securing, by said authenticator, at least part of the authentication data against tampering of the sender and the recipient;
 wherein at least one of the steps of associating and securing utilizes mathematical association methods for a selected portion of a combination of the content data and the dispatched record data.

61. A method according to claim 60, further including the step of transmitting the contents of the dispatch to the recipient.

62. A method according to claim 60, further including the step of providing an output of at least part of the authentication data.

63. A method according to claim 60, wherein the mathematical association methods utilize at least one transform function from a Hiding Class of transform functions.

64. A method according to claim 60, wherein the mathematical association methods include a method of generating a digital signature.

65. A method according to claim 60, wherein the step of providing the time related indicia includes receiving the time related indicia from an external source.

66. A method according to claim 60, wherein the step of providing the time related indicia includes generating the time related indicia.

67. A method according to claim 60, wherein the step of securing stores at least part of the authentication data in a secure storage device.

68. A method according to claim 60, wherein the step of associating is combined with the step of securing.

69. A method according to claim 60, wherein the authentication data further includes a delivery indicia relating to said dispatch.

70. A method according to claim 60, where the activities described by said steps are being performed by an authenticator, said authenticator being associated with a party other than said sender.

71. An authenticator for authenticating a dispatch and contents of the dispatch transmitted by or for a sender-from a transmitting system to a receiving system for a recipient via an electronic communication network, comprising:
 an input unit coupled to the communication network or to the transmitting system for receiving content data representative of the contents of the dispatch being electronically transmitted to said receiving system, and a destination of the dispatch;

means for providing an indicia relating to a time of transmission of the dispatch, said time related indicia being provided in a manner resistant to or indicative of tampering by either of the sender and the recipient;

a processor for associating the content data with dispatching record data which includes at least said time related indicia and an indicia relating to the destination of the dispatcher and the contents of the dispatch; and means for securing at least part of the authentication data against tampering of the sender and the recipient, the authenticator functioning as a non-interested third party with respect to the sender and the recipient;

wherein the processor utilizes mathematical association methods for a selected portion of a combination of the content data and the dispatch record data to generate the authentication data.

72. An authenticator according to claim 71, further including an output transmitter coupled to the communication network for transmitting the contents of the dispatch to the receiving system.

73. An authenticator according to claim 71, further including an output device for providing an output of at least part of the authentication data.

74. An authenticator according to claim 71, wherein the processor is combined with the means for securing.

75. An authenticator according to claim 71, wherein the mathematical association methods utilize at least one transform function from a Hiding Class of transform functions.

76. An authenticator according to claim 71, wherein the mathematical association methods include a method of generating a digital signature.

77. An authenticator according to claim 71, wherein the means for providing the time related indicia receives the time related indicia from an external source.

78. An authenticator according to claim 71, wherein the means for providing the time related indicia generates the time related indicia.

79. An authenticator according to claim 71, wherein the authentication data further includes a delivery indicia relating to said dispatch.

80. An authenticator according to claim 71, including a secure storage device for securing at least part of the authentication data.

81. An authenticator according to claim 71, wherein said authenticator is associated with a party other than said sender, or is resistant to or indicative of tampering by at least said sender.

82. An information dispatch system in an electronic communication network comprising;

a source transmitting system coupled to the electronic communicating network for sending a dispatch from a sender to a recipient;

a destination receiving system coupled to the electronic communication network for receiving the dispatch for the recipient; and an authenticator functioning as a non-interested third party with respect to the sender and the recipient for authenticating the dispatch and contents of the dispatch transmitted from the source transmitting system to the destination receiving system, including:

(1) an input unit coupled to the communication network or to the source transmitting system for receiving content data representative of the contents of the dispatch being electronically transmitted to said destination receiving system, and a destination of the dispatch;

(2) means for providing an indicia relating to a time of transmission of the dispatch, said time related indicia being provided in a manner resistant to or indicative of tampering by either of the sender and the recipient;

(3) a processor for associating the content data with dispatch record data which includes at least said time related indicia and an indicia relating to the destination of the dispatch, to generate authentication data which authenticate the dispatch and the contents of the dispatch; and (4) means for securing at least part of the authentication data against tampering of the sender and the recipient; wherein the processor is combined with the means for securing.

83. An information dispatch system according to claim 82, wherein the authenticator further includes an output device for providing an output of at least part of the authentication data.

84. An information dispatch system according to claim 82, wherein the processor utilizes mathematical association methods for a selected portion of a combination of the content data and the dispatch record data to generate the authentication data.

85. An information dispatch system according to claim 82, wherein the means for providing the time related indicia receives the time related indicia from an external source.

86. An information dispatch system according to claim 82, wherein the means for providing the time related indicia generates the time related indicia.

87. An information dispatch system according to claim 82, including a secure storage device for securing at least part of the authentication data.

88. An information dispatch system according to claim 82, wherein the authentication data further includes a delivery indicia relating to said dispatch.

89. An information dispatch system according to claim 82, wherein said authenticator is associated with a party other than said sender, or is resistant to or indicative of tampering by at least said sender.

* * * * *

UNITED STATES PATENT AND TRADEMARK OFFICE
CERTIFICATE OF CORRECTION

PATENT NO.   : 6,182,219 B1  Page 1 of 1
DATED        : January 30, 2001
INVENTOR(S)  : Ofra Feldbau et al.

It is certified that error appears in the above-identified patent and that said Letters Patent is hereby corrected as shown below:

<u>Column 25,</u>
Line 5, "dispatching" should be -- dispatch --.
Line 8, "dispatcher and the contents of the dispatch" should be -- dispatch to generate authentication data which authenticate the dispatch and the contents of the dispatch --.

Signed and Sealed this

Twenty-fourth Day of December, 2002

JAMES E. ROGAN
*Director of the United States Patent and Trademark Office*

(12) EX PARTE REEXAMINATION CERTIFICATE (9079th)
United States Patent
Feldbau et al.

(10) Number: US 6,182,219 C1
(45) Certificate Issued: Jun. 19, 2012

(54) APPARATUS AND METHOD FOR AUTHENTICATING THE DISPATCH AND CONTENTS OF DOCUMENTS

(75) Inventors: Ofra Feldbau, Ramat Gan (IL); Michael Feldbau, Ramat Gan (IL)

(73) Assignee: Rmail Limited, Pembroke (BM)

Reexamination Request:
No. 90/011,580, Mar. 17, 2011

Reexamination Certificate for:
Patent No.: 6,182,219
Issued: Jan. 30, 2001
Appl. No.: 08/981,461
Filed: Dec. 23, 1997

Certificate of Correction issued Dec. 24, 2002.

(22) PCT Filed: Aug. 27, 1996
(86) PCT No.: PCT/IB96/00859
§ 371 (c)(1), (2), (4) Date: Dec. 23, 1997
(87) PCT Pub. No.: WO97/08869
PCT Pub. Date: Mar. 6, 1997

(30) Foreign Application Priority Data

Aug. 28, 1995 (EP) .......................................... 95113489
Feb. 22, 1996 (IL) ................................................ 117234

(51) Int. Cl.
*H04L 9/32* (2006.01)

(52) U.S. Cl. ..................... 713/176; 713/178; 713/170; 713/155; 705/75; 380/258; 380/259; 380/260

(58) Field of Classification Search .................. 713/176
See application file for complete search history.

(56) References Cited

To view the complete listing of prior art documents cited during the proceeding for Reexamination Control Number 90/011,580, please refer to the USPTO's public Patent Application Information Retrieval (PAIR) system under the Display References tab.

*Primary Examiner* — Andrew Nalven

(57) ABSTRACT

Apparatus and method for authenticating that a sender has sent certain information via a dispatcher to a recipient is disclosed. The method includes the steps of: (a) providing a set A comprising a plurality of information elements $a_1, \ldots a_n$, said information element $a_1$ comprising the contents of said dispatched information, and said one or more information elements $a_2, \ldots a_n$ comprising dispatch-related information and comprise at least the following elements: $a_2$—a time indication associated with said dispatch; and $a_3$—information describing the destination of said dispatch, and wherein at least one of said information elements is provided in a manner that is resistant or indicative of tamper attempts by said sender, (b) associating said dispatch-related information with said element at by generating authentication-information, in particular comprising a representation of at least said elements $a_1$, $a_2$ and $a_3$, said representation comprising a set of one or more elements, each comprising a representation of one or more elements of said set A; (c) securing at least part of said authentication-information against undetected tamper attempts of at least said sender. The dispatch relates either to transmission or to manual delivery. The apparatus implements the operations of the method.

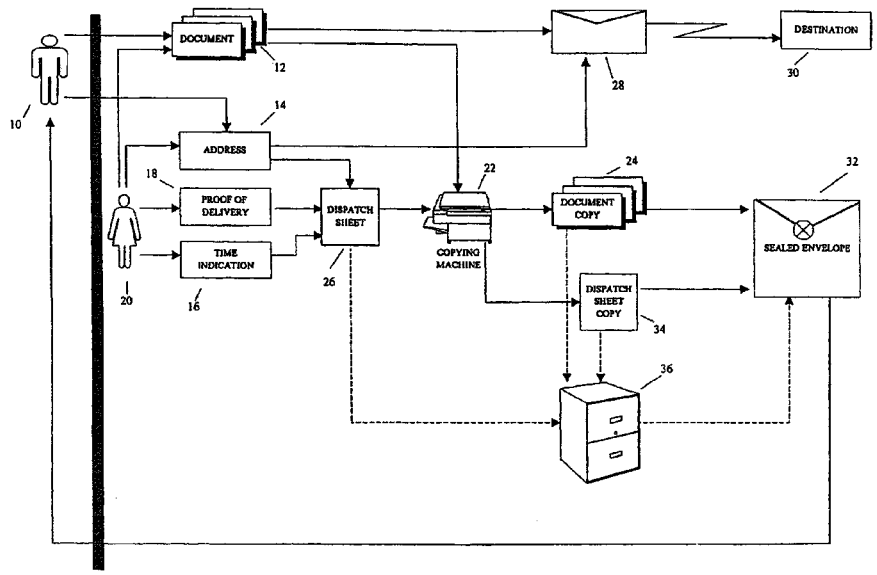

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 30, 39, 60, 65, 66, 71, 77, 78, 82, 85 and 86 are determined to be patentable as amended.

Claims 3-29, 31-38, 40-59, 61-64, 67-70, 72-76, 79-81, 83, 84 and 87-89 dependent on an amended claim, are determined to be patentable.

1. Apparatus for authenticating that certain information has been *successfully* transmitted from a sender via a dispatcher to a recipient, the apparatus comprising:

means for providing a set A comprising a plurality of information a1, . . . , an, where said information element a1 is originated from the sender and comprising the contents of the information being electronically transmitted to said recipient, and said one or more information elements a2, . . . , an comprising dispatch-related information and comprise at least the following elements:

a2—[a time indication associated with said dispatch] *an indicia of a time of the successful transmission of the certain information to the recipeint, the indicia recorded by the dispatcher*; and a3—information describing the destination of said dispatch, and wherein at least said information element a2 is provided in a manner that is resistant to or indicative of tampering by either of said sender and said recipient; and an authenticator functioning as a non-interested third party with respect to the sender and the receiver and having (1) means for associating said dispatch-related information with said element a1 by generating authentication-information comprising are representation of at least said elements a1, a2 and a3, said representation comprising a set of one or more elements, each comprising a representation of one or more elements of said set A; and (2) means for securing at least part of said authentication-information against tampering of said sender and recipient;

wherein at least one of the means for associating and for securing comprises means for generating a new set B, said set B comprising one or more information elements b1, . . . bm, each element bi comprising a representation of a subset Si, said representation being expressive as a function Fi of the elements of said subset Si, where said subset Si comprises a digital representation of at least one element of said set A, and where said functions Fi can be different.

2. Apparatus according to claim 1, wherein said element a2 comprises at least one element selected from the group consisting of [the] *a* date associated with said [dispatch] *successful transmission of the certain information to the recipient*, and [the] *a* time associated with said [dispatch] *successful transmission of the certain information to the recipient*.

30. A method for authenticating that certain information has been *successfully* transmitted from a sender via a dispatcher to a recipient, comprising the steps of:

providing a set A comprising a plurality of information elements a1, . . . , an, where said information element a1 is originated from the sender and comprising the contents of the information being electronically transmitted to said recipient, and said one or more information elements a2, . . . , an comprising dispatch-related information and comprise at least the following elements:

a2—[a time indication associated with said dispatch] *an indicia of a time of the successful transmission of the certain information to the recipient, the indicia recorded by the dispatcher*; and a3—information describing the destination of said dispatch, and wherein at least said information element a2 is provided in a manner that is resistant to or indicative of tampering by either of said sender and said recipient;

associating, by an authenticator functioning as a non-interested third party with respect to the sender and the recipient, said dispatch-related information with said element a1 by generating authentication-information comprisng a representation of at least said elements a1, a2 and a3, said representation comprising a set of one or more elements, each comprising a representation of one or more elements of said set A; and securing, by said authenticator, at least part of said authentication-information against tampering of said sender and recipient;

wherein at least one of the steps of associating and securing comprises the step of generating a new set B, said set B comprising one or more information elements b1, . . . , bm, each element bi comprising a representation of a subset Si, said representation being expressive as a function Fi of the elements of said subset Si, where said subset Si comprises a digital representation of at least one element of said set A, and where said A functions Fi can be different.

39. A method according to claim 30, wherein said element a2 comprises at least one element selected from the group consisting of [the] *a* date associated with said [dispatch] *successful transmission of the certain information to the recipient*, and [the] *a* time associated with said [dispatch] *successful transmission of the certain information to the recipient*.

60. A method of authenticating a dispatch and contents of the dispatch *successfully* transmitted from a sender to a recipient, comprising the steps of:

receiving content data representative of the contents of the dispatch originated from the sender and being electrically transmitted to said recipient, and a destination of the dispatch;

providing an indicia [relating to] *of* a time of *successful* transmission of the dispatch *to the recipient*, said time related indicia being *recorded by an authenticator and* provided in a manner resistant to or indicative of tampering by either of the sender and the recipient;

associating, by [an] *the* authenticator functioning as a non-interested third party with respect to the sender and the recipient, the content data with dispatch record data which includes at least said time related indicia and an indicia relating to the destination of the dispatch, to generate authentication data which authenticate the dispatch and the contents of the dispatch; and securing, by said authenticator, at least part of the authentication data against tampering of the sender and the recipient;

wherein at least one of the steps of associating and securing utilizes mathematical association methods for a selected portion of a combination of the content data and the dispatched record data.

65. A method according to claim 60, wherein the step of providing the time [related] indicia includes receiving the time [related] indicia from an external source.

66. A method according to claim 60, wherein the step of providing the time [related] indicia includes generating the time [related] indicia.

71. An authenticator for authenticating a dispatch and contents of the dispatch *successfully* transmitted by or for a sender-from a transmitting system to a receiving system for a recipient via an electronic communication network, comprising:

an input unit coupled to the communication network or to the transmitting system for receiving content data representative of the contents of the dispatch being electronically transmitted to said receiving system, and a destination of the dispatch;

means for providing an indicia [relating to] *of* a time of *successful* transmission of the dispatch *to the receiving system*, said time related indicia being *recorded by the authenticator and* provided in a manner resistant to or indicative of tampering by either of the sender and the recipient;

a processor for associating the content data with dispatch record data which includes at least said time related indicia and an indicia relating to the destination of the dispatch to generate authentication data which authenticate the dispatch and the contents of the dispatch means for securing at least part of the authentication data against tampering of the sender and the recipient, the authenticator functioning as a non-interested third party with respect to the sender and the recipient;

wherein the processor utilizes mathematical association methods for a selected portion of a combination of the content data and the dispatch record data to generate the authentication data.

77. An authenticator according to claim 71, wherein the means for providing the time [related] indicia receives the time [related] indicia from an external source.

78. An authenticator according to claim 71, wherein the means for providing the time [related] indicia generates the time [related] indicia.

82. An information dispatch system in an electronic communication network comprising;

a source transmitting system coupled to the electronic communicating network for sending a dispatch from a sender to a recipient;

a destination receiving system coupled to the electronic communicaton network for receiving the dispatch for the recipient; and an authenticator functioning as a non-interested third party with respect to the sender and the recipient for authenticating the dispatch and contents of the dispatch transmitted from the source transmitting system to the destination receiving system, including:

(1) an input unit coupled to the communication network or to the source transmitting system for receiving content data representative of the contents of the dispatch being electronically transmitted to said destination receiving system, and a destination of the dispatch;

(2) means for providing an indicia [relating to] *of* a time of *successful* transmission of the dispatch *to the destination receiving system*, said time related indicia being *recorded by the authenticator and* provided in a manner resistant to or indicative of tampering by either of the sender and the recipient;

(3) a processor for associating the content data with dispatch record data which includes at least said time related indicia and an indicia relating to the destination of the dispatch, to generate authentication data which authenticate the dispatch and the contents of the dispatch; and (4) means for securing at least part of the authentication data against tampering of the sender and the recipient;

wherein the processor is combined with the means for securing.

85. An information dispatch system according to claim 82, wherein the means for providing the time [related] indicia receives the time [related] indicia from an external source.

86. An information dispatch system according to claim 82, wherein the means for providing the time [related] indicia generates the time [related] indicia.

* * * * *